US012603317B2

(12) United States Patent
Mikami et al.

(10) Patent No.: US 12,603,317 B2
(45) Date of Patent: Apr. 14, 2026

(54) ELECTRODE MATERIAL, MEMBRANE ELECTRODE ASSEMBLY, ELECTROCHEMICAL CELL AND FUEL CELL SYSTEM

(71) Applicant: Panasonic Intellectual Property Management Co., Ltd., Osaka (JP)

(72) Inventors: Yuichi Mikami, Kyoto (JP); Kosuke Nunoo, Osaka (JP); Takehito Goto, Osaka (JP); Hiroshi Asano, Osaka (JP); Takeshi Terayama, Osaka (JP); Tomohiro Kuroha, Osaka (JP); Hideaki Murase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 724 days.

(21) Appl. No.: 17/901,874

(22) Filed: Sep. 2, 2022

(65) Prior Publication Data

US 2023/0006235 A1     Jan. 5, 2023

Related U.S. Application Data

(63) Continuation of application No. PCT/JP2021/009976, filed on Mar. 12, 2021.

(30) Foreign Application Priority Data

Mar. 25, 2020    (JP) ................................. 2020-055146
Mar. 25, 2020    (JP) ................................. 2020-055147

(51) Int. Cl.
H01M 8/1253        (2016.01)
C01G 25/00         (2006.01)
(Continued)

(52) U.S. Cl.
CPC ........ H01M 8/1253 (2013.01); C01G 25/006 (2013.01); H01M 8/1004 (2013.01);
(Continued)

(58) Field of Classification Search
None
See application file for complete search history.

(56) References Cited

U.S. PATENT DOCUMENTS

2001/0018989 A1      9/2001   Taniguchi
2017/0288248 A1*    10/2017   Mikami .............. H01M 8/1253

FOREIGN PATENT DOCUMENTS

CN        106784864  A      5/2017
JP        2001-307546       11/2001
(Continued)

OTHER PUBLICATIONS

The EPC Office Action dated Nov. 28, 2023 for the related European Patent Application No. 21775288.0.
(Continued)

*Primary Examiner* — Kaj K Olsen

(74) *Attorney, Agent, or Firm* — Rimon P.C.

(57) ABSTRACT

An electrode material of the present disclosure is an electrode material that includes a compound represented by the chemical formula $BaZr_{1-x-y}M_xCo_yO_{3-\delta}$. M is In or Yb, and the chemical formula satisfies $0<x<1$, $0<y<1$, $0<(x+y)<1$, and $0<\delta<1$. A membrane electrode assembly of the present disclosure includes a first electrode including the electrode
(Continued)

material, and an electrolyte membrane provided on a first main surface of the first electrode.

14 Claims, 10 Drawing Sheets

(51) Int. Cl.
    *H01M 8/1004*     (2016.01)
    *H01M 8/126*     (2016.01)
    *H01M 8/12*     (2016.01)

(52) U.S. Cl.
    CPC ......... *H01M 8/126* (2013.01); *C01P 2002/77* (2013.01); *H01M 2008/1293* (2013.01)

(56) References Cited

FOREIGN PATENT DOCUMENTS

| JP | 2005-336022 | | 12/2005 |
|----|----|----|----|
| JP | 3733030 | B2 | 1/2006 |
| JP | 2020-024847 | A | 2/2020 |

OTHER PUBLICATIONS

Rao Yuanyuan et al: "Cobalt-doped BaZrO3: A single phase air electrode material for reversible solid oxide cells", International Journal of Hydrogen Energy, vol. 37, No. 17, Jun. 27, 2012 (Jun. 27, 2012), pp. 12522-12527, XP93102662.
International Search Report of PCT application No. PCT/JP2021/009976 dated May 18, 2021.
English Translation of Chinese Search Report dated Apr. 30, 2025 for the related Chinese Patent Application No. 202180022405.3.
The EPC Office Action dated Mar. 10, 2025 for the related European Patent Application No. 21775288.0.
Rao Yuanyuan et al: "Cobalt-doped BaZrO3: A single phase air electrode material for reversible solid oxide cells", International Journal of Hydrogen Energy, vol. 37, No. 17, Jun. 27, 2012 (Jun. 27, 2012), pp. 12522-12527, XP93102662.
Azimova M A et al: "Transport properties and stability of cobalt doped proton conducting oxides", Solid State Ionics, vol. 180, No. 2-3, Mar. 9, 2009 (Mar. 9, 2009), pp. 160-167, XP025958447.

* cited by examiner

ELECTRODE MATERIAL, MEMBRANE ELECTRODE ASSEMBLY, ELECTROCHEMICAL CELL AND FUEL CELL SYSTEM

BACKGROUND

1. Technical Field

The present disclosure relates to an electrode material, a membrane electrode assembly, an electrochemical cell and a fuel cell system.

2. Description of the Related Art

For example, solid oxide fuel cells (hereinafter, written as "SOFCs") are known as a type of electrochemical cells that use an electrolyte material composed of a solid oxide. Oxide ion conductors, typically stabilized zirconia, are generally used widely as SOFC electrolyte materials. The oxide ion conductors exhibit a lower ion conductivity with decreasing temperature. Thus, SOFCs utilizing stabilized zirconia as an electrolyte material need to be operated at a temperature of, for example, higher than or equal to 700° C.

On the other hand, SOFCs using a proton conductive electrolyte material may be operated at, for example, about 500° C. to 600° C. This is because protons are conducted with less activation energy than oxide ions, and the decrease in ion conductivity is small even at a low temperature. Thus, SOFCs using a proton conductive electrolyte material attract attention from the points of view of chemical stability of members and cost reduction.

Typical proton conductive electrolyte materials that are known are perovskite-type composite oxides represented by the chemical formula $BaCe_{1-x}M_xO_{3-\alpha}$, $BaZr_{1-x-y}Ce_xM_yO_{3-\alpha}$ or $BaZr_{1-x}M_xO_{3-\alpha}$. In these chemical formulas, M is a trivalent substitution element. The value of $\alpha$ indicates the amount of oxygen deficiency. The values of x and y satisfy $0<x<1$, $0<y<1$, and $0<(x+y)<1$.

As described in, for example, Japanese Patent No. 4583810 (Patent Literature 1) and Japanese Patent No. 3733030 (Patent Literature 2), proton conductive perovskite-type composite oxides are conventionally suggested as electrolyte materials for constituting SOFC electrolyte membranes.

SUMMARY

In general, similar electrode materials are used in an SOFC having a proton conductive electrolyte material and in an SOFC having an oxide ion conductive electrolyte material. Thus, the development is demanded of an electrode material that may be suitably used in, for example, an SOFC having a proton conductive electrolyte material and that may exhibit an excellent performance as an electrode.

One non-limiting and exemplary embodiment provides an electrode material that exhibits an excellent performance as an electrode.

In one general aspect, the techniques disclosed here feature an electrode material including a compound represented by the chemical formula $BaZr_{1-x-y}M_xCo_yO_{3-\delta}$ wherein M is In or Yb, and the chemical formula satisfies $0<x<1$, $0<y<1$, $0<(x+y)<1$, and $0<\delta<1$.

The electrode material provided according to the present disclosure exhibits an excellent performance as an electrode.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1A:
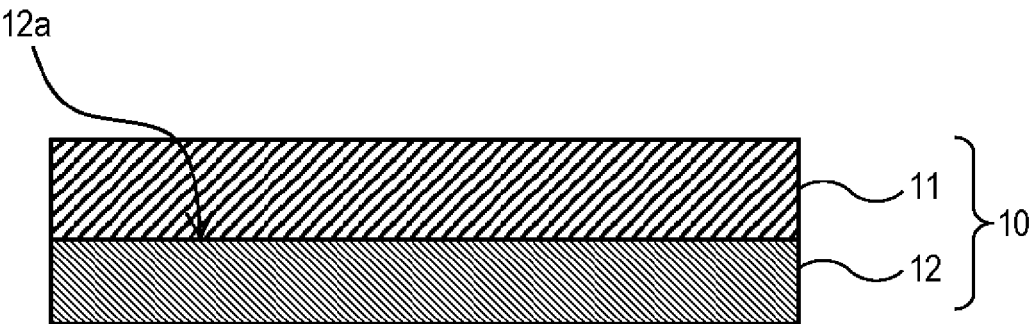
FIG. 1A illustrates a sectional view of a membrane electrode assembly according to embodiment 3.

DETAILED DESCRIPTIONS (Underlying Knowledge Forming Basis of One Aspect of the Present Disclosure)

As a proton conductive material having excellent low-temperature sinterability, Patent Literature 1 describes a metal oxide with a perovskite-type structure that includes at least one transition metal of nickel, cobalt, chromium, manganese and iron in a molar ratio of greater than or equal to 0.01 and less than or equal to 0.2. Patent Literature 1 describes that transition metals such as nickel are elements effective for enhancing low-temperature sinterability, chemical stability in a high-temperature region, denseness and mechanical strength. Although not studied in Patent Literature 1, catalytic activity has been confirmed in some of the above transition metal elements themselves or in compounds containing such transition metal elements. For example, nickel is used as an SOFC fuel electrode.

As a proton conductive material, Patent Literature 2 provides an oxide with a perovskite-type structure represented by the chemical formula $BaZr_{1-x}M_xO_{3-p}$. This material has high proton conductivity and high physical and chemical stability. Here, the chemical formula $BaZr_{1-x}M_xO_{3-p}$ satisfies $0<x<1$, and $0<p<1.5$. In the chemical formula $BaZr_{1-x}M_xO_{3-p}$, M is a trivalent substitution element. The substitution element M is at least one element selected from La, Pr, Nd, Pm, Sm, Eu, Gd, Tb, Dy, Ho, Er, Tm, Yb, Y, Sc, Mn, Fe, Co, Ni, Al, Ga and In. Although not studied in Patent Literature 2, catalytic activity has been confirmed in some of the elements described as exemplary substitution elements M, specifically, in some of the transition metal elements themselves or in compounds containing such transition metal elements. For example, nickel is used as an SOFC fuel electrode.

The present inventors then carried out extensive studies on the proton conductive materials disclosed in Patent Literature 1 and Patent Literature 2, and have consequently found the following. That is, the present inventors have found that transition element cobalt that is added to a proton conductive material allows the material to exhibit catalytic activity and to serve as an electrode material. The finding has led to the present disclosure described below.

Embodiment 1

An electrode material according to embodiment 1 includes a compound represented by the chemical formula $BaZr_{1-x-y}M_xCo_yO_{3-\delta}$ wherein M is In. That is, the electrode material according to the embodiment 1 includes a compound represented by the chemical formula $BaZr_{1-x-y}In_xCo_yO_{3-\delta}$ as will be illustrated in EXAMPLE 1 to EXAMPLE 21 described later. Here, the chemical formula satisfies $0<x<1$, $0<y<1$, $0<(x+y)<1$, and $0<\delta<1$. The electrode material according to the embodiment 1 can attain a low reaction resistance at a temperature of, for example, 600° C. Thus, the electrode material according to the embodiment 1 can function as an electrode material that may be used in, for example, an SOFC electrode. The electrode material according to the embodiment 1 may satisfy $0<\delta<0.5$.

The electrode material according to the embodiment 1 may have a reaction resistance of, for example, less than or equal to 6 $\Omega cm^2$ at 600° C. When the electrode material according to the embodiment 1 has such a low reaction resistance, the electrode material according to the embodiment 1 can exhibit an excellent performance as an electrode.

The compound represented by the chemical formula $BaZr_{1-x-y}In_xCo_yO_{3-\delta}$ has proton conductivity. Thus, when, for example, the electrode material according to the embodiment 1 is used in an air electrode of an SOFC in which an electrolyte membrane includes a proton conductive electrolyte material, useful reaction fields may be created not only at the contact face among the air electrode, the electrolyte membrane and oxygen (that is, at the air electrode-electrolyte membrane-oxygen three-phase interface) but also at the contact face between the air electrode and oxygen (that is, at the air electrode-oxygen two-phase interface). Thus, the electrode material according to the embodiment 1 can exhibit an excellent performance as an electrode when used in, for example, an electrode of an SOFC in which an electrolyte membrane includes a proton conductive electrolyte material.

For example, the electrode material according to the embodiment 1 may include the compound represented by the chemical formula $BaZr_{1-x-y}In_xCo_yO_{3-\delta}$ in a molar ratio of greater than or equal to 30% or in a molar ratio of greater than or equal to 50%. When the electrode material according to the embodiment 1 includes the compound represented by the chemical formula $BaZr_{1-x-y}In_xCo_yO_{3-\delta}$ in the above range, the electrode material according to the embodiment 1 can exhibit a higher performance as an electrode.

The compound represented by the chemical formula $BaZr_{1-x-y}In_xCo_yO_{3-\delta}$ may satisfy the mathematical formulas (1) to (3) below:

| | |
|---|---|
| $0.125 \le y \le 0.5$ | Mathematical formula (1): |
| $y \le 3x - 0.25$ | Mathematical formula (2): |
| $y \le -3x + 2$ | Mathematical formula (3): |

As will be illustrated in EXAMPLE 1, EXAMPLE 3, EXAMPLE 8 to EXAMPLE 11, and EXAMPLE 13 to EXAMPLE 19 described later, the electrode material that includes the compound satisfying the above mathematical formulas (1) to (3) can attain a value of reaction resistance lower than 12.3 $\Omega cm^2$ (namely, a value of reaction resistance lower than the value of reaction resistance in COMPARATIVE EXAMPLE 1 described later). Thus, such an electrode material will exhibit an excellent performance as an electrode.

The compound represented by the chemical formula $BaZr_{1-x-y}In_xCo_yO_{3-\delta}$ may satisfy the mathematical formulas (4) to (7) below:

| | |
|---|---|
| $0.125 \le y \le 0.375$ | Mathematical formula (4): |
| $0.25 \le x \le 0.5$ | Mathematical formula (5): |
| $y \ge -x + 0.5$ | Mathematical formula (6): |
| $y \le -x + 0.75$ | Mathematical formula (7): |

As will be illustrated in EXAMPLE 1, EXAMPLE 3, EXAMPLE 8 to EXAMPLE 10, and EXAMPLE 13 to EXAMPLE 19 described later, the electrode material that includes the compound satisfying the above mathematical formulas (4) to (7) may be composed of the compound as a single compound. In other words, the electrode material that includes the compound satisfying the above mathematical formulas (4) to (7) is free from, for example, oxides derived from starting materials, or starting materials for $In_2O_3$ (hereinafter, "starting material-derived impurities"). Such an electrode material attains a low reaction resistance as compared to an electrode material that includes starting material-derived impurities, as will be illustrated in EXAMPLE 1, EXAMPLE 3, EXAMPLE 8 to EXAMPLE 10, and EXAMPLE 13 to EXAMPLE 19 described later. Thus, such an electrode material will exhibit a higher performance as an electrode.

The compound represented by the chemical formula $BaZr_{1-x-y}In_xCo_yO_{3-\delta}$ may satisfy the mathematical formulas (8) to (11) below:

| | |
|---|---|
| $0.25 \le x \le 0.5$ | Mathematical formula (8): |
| $y \le 0.375$ | Mathematical formula (9): |
| $y \le -x + 0.75$ | Mathematical formula (10): |
| $y \ge -0.5x + 0.375$ | Mathematical formula (11): |

As will be illustrated in EXAMPLE 1, EXAMPLE 9, EXAMPLE 10, EXAMPLE 14, EXAMPLE 16 and EXAMPLE 17 described later, the electrode material that includes the compound satisfying the above mathematical formulas (8) to (11) can attain a value of reaction resistance lower than 0.49 $\Omega cm^2$ (namely, a value of reaction resistance lower than the value of reaction resistance in COMPARATIVE EXAMPLE 2 described later). Thus, such an electrode material will exhibit a higher performance as an electrode.

The compound represented by the chemical formula $BaZr_{1-x-y}In_xCo_yO_{3-\delta}$ may satisfy one mathematical formula selected from the group consisting of the mathematical formulas (A1) to (A6) below:

| | |
|---|---|
| $0.075 \leq x \leq 0.175$ and $0.075 \leq y \leq 0.175$ | Mathematical formula (A1): |
| $0.200 \leq x \leq 0.300$ and $0.075 \leq y \leq 0.425$ | Mathematical formula (A2): |
| $0.325 \leq x \leq 0.425$ and $0.075 \leq y \leq 0.550$ | Mathematical formula (A3): |
| $0.450 \leq x \leq 0.550$ and $0.075 \leq y \leq 0.425$ | Mathematical formula (A4): |
| $0.575 \leq x \leq 0.675$ and $0.075 \leq y \leq 0.300$ | Mathematical formula (A5): |
| $0.700 \leq x \leq 0.800$ and $0.075 \leq y \leq 0.175$ | Mathematical formula (A6): |

As will be illustrated in EXAMPLE 1, EXAMPLE 3, EXAMPLE 8 to EXAMPLE 10, and EXAMPLE 13 to EXAMPLE 21 described later, the electrode material that includes the compound satisfying one mathematical formula selected from the group consisting of the mathematical formulas (A1) to (A6) may be composed of the compound as a single compound. In other words, the electrode material that includes the compound satisfying one mathematical formula selected from the group consisting of the mathematical formulas (A1) to (A6) is free from, for example, oxides derived from starting materials, or starting materials for $In_2O_3$ (hereinafter, "starting material-derived impurities"). Such an electrode material attains a low reaction resistance as compared to an electrode material that includes starting material-derived impurities, as will be illustrated in EXAMPLE 1, EXAMPLE 3, EXAMPLE 8 to EXAMPLE 10, and EXAMPLE 13 to EXAMPLE 21 described later. Thus, such an electrode material will exhibit a higher performance as an electrode.

The compound represented by the chemical formula $BaZr_{1-x-y}In_xCo_yO_{3-\delta}$ may satisfy one mathematical formula selected from the group consisting of the mathematical formulas (A7) to (A9) below:

| | |
|---|---|
| $0.200 \leq x \leq 0.300$ and $0.200 \leq y \leq 0.425$ | Mathematical formula (A7): |
| $0.325 \leq x \leq 0.425$ and $0.075 \leq y \leq 0.425$ | Mathematical formula (A8): |
| $0.450 \leq x \leq 0.550$ and $0.075 \leq y \leq 0.300$ | Mathematical formula (A9): |

As will be illustrated in EXAMPLE 1, EXAMPLE 8 to EXAMPLE 10, EXAMPLE 13, EXAMPLE 14, EXAMPLE 16 and EXAMPLE 17 described later, the electrode material that includes the compound satisfying one mathematical formula selected from the group consisting of the mathematical formulas (A7) to (A9) can attain a low reaction resistance of less than or equal to 2 $\Omega cm^2$ at 600° C. Thus, such an electrode material will exhibit a higher performance as an electrode.

The compound represented by the chemical formula $BaZr_{1-x-y}In_xCo_yO_{3-\delta}$ may satisfy one mathematical formula selected from the group consisting of the mathematical formulas (A10) and (A11) below:

| | |
|---|---|
| $0.200 \leq x \leq 0.300$ and $0.200 \leq y \leq 0.300$ | Mathematical formula (A10): |
| $0.325 \leq x \leq 0.425$ and $0.200 \leq y \leq 0.425$ | Mathematical formula (A11): |

As will be illustrated in EXAMPLE 1, EXAMPLE 9 and EXAMPLE 14 described later, the electrode material that includes the compound satisfying one mathematical formula selected from the group consisting of the mathematical formulas (A10) and (A11) can attain a value of reaction resistance lower than 0.13 $\Omega cm^2$ at 600° C. Thus, such an electrode material will exhibit a higher performance as an electrode.

The electrode material according to the embodiment 1 may be composed of the compound represented by the chemical formula $BaZr_{1-x-y}In_xCo_yO_{3-\delta}$ as is the case for the electrode materials of EXAMPLE 1, EXAMPLE 3, EXAMPLE 8 to EXAMPLE 10, and EXAMPLE 13 described later.

The phrase "the electrode material according to the embodiment 1 is composed of the compound represented by the chemical formula $BaZr_{1-x-y}In_xCo_yO_{3-\delta}$" means that the compound represented by the chemical formula $BaZr_{1-x-y}In_xCo_yO_{3-\delta}$ represents a molar ratio of greater than or equal to 90% of the electrode material according to the embodiment 1. When the electrode material according to the embodiment 1 is composed of the compound represented by the chemical formula $BaZr_{1-x-y}In_xCo_yO_{3-\delta}$, the electrode material according to the embodiment 1 can exhibit a higher performance as an electrode.

As an example, the electrode material according to the embodiment 1 may consist essentially of the compound represented by the chemical formula $BaZr_{1-x-y}In_xCo_yO_{3-\delta}$. The phrase "the electrode material according to the embodiment 1 consists essentially of the compound represented by the chemical formula $BaZr_{1-x-y}In_xCo_yO_{3-\delta}$" means that the electrode material according to the embodiment 1 consists solely of the compound represented by the chemical formula $BaZr_{1-x-y}In_xCo_yO_{3-\delta}$ except for inevitable impurity components. In this case, the compound represented by the chemical formula $BaZr_{1-x-y}In_xCo_yO_{3-\delta}$ may represent a molar ratio of greater than or equal to 95% of the electrode material according to the embodiment 1.

The electrode material according to the embodiment 1 may include an additional component in addition to the compound represented by the chemical formula $BaZr_{1-x-y}In_xCo_yO_{3-\delta}$. For example, the electrode material according to the embodiment 1 may further include such additional components as impurities (for example, $BaCO_3$, $ZrO_2$ or $In_2O_3$) occurring in the process of synthesizing the above compound.

As described hereinabove, the electrode material according to the embodiment 1 is an electrode material that may be suitably used in an air electrode of an SOFC particularly when an electrolyte membrane includes a proton conductive electrolyte material. The electrode material according to the embodiment 1, however, may also be used as an electrode material for an SOFC in which an electrolyte material used in an electrolyte membrane is an oxide ion conductor.

Embodiment 2

An electrode material according to embodiment 2 includes a compound represented by the chemical formula $BaZr_{1-x-y}M_xCo_yO_{3-\delta}$ wherein M is Yb. That is, the electrode material according to the embodiment 2 includes a compound represented by the chemical formula $BaZr_{1-x-y}Yb_xCo_yO_{3-\delta}$ as will be illustrated in EXAMPLE 22 to EXAMPLE 48 described later. Here, the chemical formula satisfies $0<x<1$, $0<y<1$, $0<(x+y)<1$, and $0<\delta<1$. The electrode material according to the embodiment 2 can attain a low reaction resistance at a temperature of, for example, about 500° C. to 600° C. Thus, the electrode material according to the embodiment 2 can function as an electrode material that may be used in, for example, an SOFC electrode. The electrode material according to the embodiment 2 may satisfy $0 < \delta < 0.5$.

The electrode material according to the embodiment 2 may have a reaction resistance of, for example, less than or equal to 1 $\Omega cm^2$ at 600° C. When the electrode material according to the embodiment 2 has such a low reaction resistance, the electrode material according to the embodiment 2 can exhibit an excellent performance as an electrode.

The compound represented by the chemical formula $BaZr_{1-x-y}Yb_xCo_yO_{3-\delta}$ has proton conductivity. Thus, when, for example, the electrode material according to the embodiment 2 is used in an air electrode of an SOFC in which an electrolyte membrane includes a proton conductive electrolyte material, useful reaction fields may be created not only at the contact face among the air electrode, the electrolyte membrane and oxygen (that is, at the air electrode-electrolyte membrane-oxygen three-phase interface) but also at the contact face between the air electrode and oxygen (that is, at the air electrode-oxygen two-phase interface). Thus, the electrode material according to the embodiment 2 can exhibit an excellent performance as an electrode when used in, for example, an electrode of an SOFC in which an electrolyte membrane includes a proton conductive electrolyte material.

For example, the electrode material according to the embodiment 2 may include the compound represented by the chemical formula $BaZr_{1-x-y}Yb_xCo_yO_{3-\delta}$ in a molar ratio of greater than or equal to 30% or in a molar ratio of greater than or equal to 50%. When the electrode material according to the embodiment 2 includes the compound represented by the chemical formula $BaZr_{1-x-y}Yb_xCo_yO_{3-\delta}$ in the above range, the electrode material according to the embodiment 2 can exhibit a higher performance as an electrode.

The compound represented by the chemical formula $BaZr_{1-x-y}Yb_xCo_yO_{3-\delta}$ may satisfy the mathematical formulas (12) and (13) below:

$$0.075 \leq x \leq 0.625 \qquad \text{Mathematical formula (12):}$$

$$0.125 \leq y \qquad \text{Mathematical formula (13):}$$

As will be illustrated in EXAMPLE 22 to EXAMPLE 41, and EXAMPLE 43 to EXAMPLE 48 described later, the electrode material that includes the compound satisfying the above mathematical formulas (12) and (13) can attain a value of reaction resistance lower than 1.42 $\Omega cm^2$ at 600° C. (namely, a value of reaction resistance lower than the value of reaction resistance in COMPARATIVE EXAMPLE 3 described later). Thus, such an electrode material will exhibit a higher performance as an electrode.

The compound represented by the chemical formula $BaZr_{1-x-y}Yb_xCo_yO_{3-\delta}$ may satisfy the mathematical formulas (14) and (15) below:

$$y \leq 12.5x - 0.6875 \qquad \text{Mathematical formula (14):}$$

$$y \geq x - 0.375 \qquad \text{Mathematical formula (15):}$$

As will be illustrated in EXAMPLE 22, EXAMPLE 24 to EXAMPLE 41, EXAMPLE 43 and EXAMPLE 44 described later, the electrode material that includes the compound satisfying the above mathematical formulas (14) and (15) may be composed of the compound as a single compound. In other words, the electrode material that includes the compound satisfying the above mathematical formulas (14) and (15) may be an electrode material free from, for example, oxides derived from starting materials (hereinafter, "starting material-derived impurities"). That is, the electrode material that includes the compound satisfying the above mathematical formulas (14) and (15) is particularly free from byproduct phases and can attain a high performance. The phrase "free from byproduct phases" as used herein means that X-ray diffractometry detects no components other than the components that constitute the electrode material of interest. That is, the phrase does not exclude the presence of other components at impurity levels. Such an electrode material will attain a low reaction resistance as compared to an electrode material that includes starting material-derived impurities. Thus, such an electrode material will exhibit a higher performance as an electrode.

The compound represented by the chemical formula $BaZr_{1-x-y}Yb_xCo_yO_{3-\delta}$ may satisfy the mathematical formulas (16) and (17) below.

$$y \leq -2.5x + 0.4375 \qquad \text{Mathematical formula (16):}$$

$$y \geq x - 0.375 \qquad \text{Mathematical formula (17):}$$

The electrode material that includes the compound satisfying the above mathematical formulas (16) and (17) is free from byproduct phases and can attain a higher electrode performance. As will be illustrated in EXAMPLE 22, EXAMPLES 25 to 41, and EXAMPLE 44 described later, the electrode material that includes the compound satisfying the above mathematical formulas (16) and (17) can attain a low value of reaction resistance lower than 0.49 $\Omega cm^2$ at 600° C. (namely, a value of reaction resistance lower than the value of reaction resistance in COMPARATIVE EXAMPLE 2 described later). Thus, such an electrode material will exhibit a higher performance as an electrode.

The compound represented by the chemical formula $BaZr_{1-x-y}Yb_xCo_yO_{3-\delta}$ may satisfy one mathematical formula selected from the group consisting of the mathematical formulas (B1) to (B5) below:

$$0.075 \leq x \leq 0.175 \text{ and } 0.075 \leq y \leq 0.800 \qquad \text{Mathematical formula (B1):}$$

$$0.200 \leq x \leq 0.300 \text{ and } 0.075 \leq y \leq 0.675 \qquad \text{Mathematical formula (B2):}$$

$$0.325 \leq x \leq 0.425 \text{ and } 0.075 \leq y \leq 0.550 \qquad \text{Mathematical formula (B3):}$$

$$0.450 \leq x \leq 0.550 \text{ and } 0.075 \leq y \leq 0.425 \qquad \text{Mathematical formula (B4):}$$

$$0.575 \leq x \leq 0.675 \text{ and } 0.200 \leq y \leq 0.300 \qquad \text{Mathematical formula (B5):}$$

As will be illustrated in EXAMPLE 22, EXAMPLE 24 to EXAMPLE 41, EXAMPLE 43 and EXAMPLE 44 described later, the electrode material that includes the compound satisfying one mathematical formula selected from the group consisting of the mathematical formulas (B1) to (B5) may be composed of the compound as a single compound. In other words, the electrode material that includes the compound satisfying one mathematical formula selected from the group consisting of the mathematical formulas (B1) to (B5) may be an electrode material free from, for example, impurities derived from starting materials. That is, the electrode material that includes the compound satisfying one mathematical formula selected from the group consisting of the mathematical formulas (B1) to (B5) is particularly free from byproduct phases and can attain a high performance. This phrase does not exclude the presence of other components at impurity levels. Such an electrode material will attain a low reaction resistance as compared to an electrode material that includes impurities derived from starting materials. Thus, such an electrode material will exhibit a higher performance as an electrode.

The compound represented by the chemical formula $BaZr_{1-x-y}Yb_xCo_yO_{3-\delta}$ may satisfy one mathematical formula selected from the group consisting of the mathematical formulas (B6) to (B10) below:

$$0.075 \leq x \leq 0.175 \text{ and } 0.200 \leq y \leq 0.800 \qquad \text{Mathematical formula (B6):}$$

$$0.200 \leq x \leq 0.300 \text{ and } 0.075 \leq y \leq 0.675 \qquad \text{Mathematical formula (B7):}$$

$$0.325 \leq x \leq 0.425 \text{ and } 0.075 \leq y \leq 0.550 \qquad \text{Mathematical formula (B8):}$$

$$0.450 \leq x \leq 0.550 \text{ and } 0.075 \leq y \leq 0.425 \qquad \text{Mathematical formula (B9):}$$

$$0.575 \leq x \leq 0.675 \text{ and } 0.200 \leq y \leq 0.300 \qquad \text{Mathematical formula (B10):}$$

The electrode material that includes the compound satisfying one mathematical formula selected from the group consisting of the mathematical formulas (B6) to (B10) is free from byproduct phases and can attain a higher electrode performance. As will be illustrated in EXAMPLE 22, EXAMPLE 25 to EXAMPLE 41, and EXAMPLE 44 described later, the electrode material that includes the compound satisfying one mathematical formula selected from the group consisting of the mathematical formulas (B6) to (B10) can attain a low reaction resistance of less than or equal to 0.50 $\Omega cm^2$ at 600° C. Thus, such an electrode material will exhibit a higher performance as an electrode.

The compound represented by the chemical formula $BaZr_{1-x-y}Yb_xCo_yO_{3-\delta}$ may satisfy one mathematical formula selected from the group consisting of the mathematical formulas (B11) to (B14) below:

$$0.075 \leq x \leq 0.175 \text{ and } 0.200 \leq y \leq 0.800 \qquad \text{Mathematical formula (B11):}$$

$$0.200 \leq x \leq 0.300 \text{ and } 0.200 \leq y \leq 0.675 \qquad \text{Mathematical formula (B12):}$$

$$0.325 \leq x \leq 0.425 \text{ and } 0.075 \leq y \leq 0.425 \qquad \text{Mathematical formula (B13):}$$

$$0.450 \leq x \leq 0.550 \text{ and } 0.200 \leq y \leq 0.425 \qquad \text{Mathematical formula (B14):}$$

The electrode material that includes the compound satisfying one mathematical formula selected from the group consisting of the mathematical formulas (B11) to (B14) is free from byproduct phases and can attain a higher electrode performance. As will be illustrated in EXAMPLE 22, EXAMPLES 25 to 29, EXAMPLE 31 to EXAMPLE 36, EXAMPLE 39 and EXAMPLE 40 described later, the electrode material that includes the compound satisfying one mathematical formula selected from the group consisting of the mathematical formulas (B11) to (B14) can attain a low value of reaction resistance of less than or equal to 0.20 $\Omega cm^2$ at 600° C. Thus, such an electrode material will exhibit a higher performance as an electrode.

The compound represented by the chemical formula $BaZr_{1-x-y}Yb_xCo_yO_{3-\delta}$ may satisfy one mathematical formula selected from the group consisting of the mathematical formulas (B15) to (B18) below:

$$0.075 \leq x \leq 0.175 \text{ and } 0.325 \leq y \leq 0.425 \qquad \text{Mathematical formula (15):}$$

$$0.075 \leq x \leq 0.175 \text{ and } 0.575 \leq y \leq 0.800 \qquad \text{Mathematical formula (16):}$$

$$0.200 \leq x \leq 0.300 \text{ and } 0.200 \leq y \leq 0.425 \qquad \text{Mathematical formula (17):}$$

$$0.325 \leq x \leq 0.425 \text{ and } 0.200 \leq y \leq 0.425 \qquad \text{Mathematical formula (18):}$$

The electrode material that includes the compound satisfying one mathematical formula selected from the group consisting of the mathematical formulas (B15) to (B18) is free from byproduct phases and can attain a particularly high electrode performance. As will be illustrated in EXAMPLE 22, EXAMPLE 27, EXAMPLE 28, EXAMPLE 29, EXAMPLE 31, EXAMPLE 35 and EXAMPLE 36 described later, the electrode material that includes the compound satisfying one mathematical formula selected from the group consisting of the mathematical formulas (B15) to (B18) can attain a value of reaction resistance lower than 1.42 $\Omega cm^2$ at 600° C. (namely, a value of reaction resistance lower than the value of reaction resistance in COMPARATIVE EXAMPLE 3 described later).

Thus, such an electrode material will exhibit a particularly high performance as an electrode material.

The electrode material according to the embodiment 2 may be composed of the compound represented by the chemical formula $BaZr_{1-x-y}Yb_xCo_yO_{3-\delta}$ as is the case for the electrode materials of EXAMPLE 22, EXAMPLE 24 to EXAMPLE 41, EXAMPLE 43 and EXAMPLE 44 described later. The electrode material according to this configuration is free from byproduct phases.

The phrase "the electrode material according to the embodiment 2 is composed of the compound represented by the chemical formula $BaZr_{1-x-y}Yb_xCo_yO_{3-\delta}$" means that the compound represented by the chemical formula $BaZr_{1-x-y}Yb_xCo_yO_{3-\delta}$ represents a molar ratio of greater than or equal to 90% of the electrode material according to the embodiment 2. When the electrode material according to the embodiment 2 is composed of the compound represented by the chemical formula $BaZr_{1-x-y}Yb_xCo_yO_{3-\delta}$, the electrode material according to the embodiment 2 can exhibit a higher performance as an electrode.

As an example, the electrode material according to the embodiment 2 may consist essentially of the compound represented by the chemical formula $BaZr_{1-x-y}Yb_xCo_yO_{3-\delta}$. The phrase "the electrode material according to the embodiment 2 consists essentially of the compound represented by the chemical formula $BaZr_{1-x-y}Yb_xCo_yO_{3-\delta}$" means that the electrode material according to the embodiment 2 consists solely of the compound represented by the chemical formula $BaZr_{1-x-y}Yb_xCo_yO_{3-\delta}$ except for inevitable impurity components. In this case, the compound represented by the chemical formula $BaZr_{1-x-y}Yb_xCo_yO_{3-\delta}$ may represent a molar ratio of greater than or equal to 95% of the electrode material according to the embodiment 2.

The electrode material according to the embodiment 2 may include an additional component in addition to the compound represented by the chemical formula $BaZr_{1-x-y}Yb_xCo_yO_{3-\delta}$. As such additional components, for example, the electrode material according to the embodiment 2 may further include impurities or metal oxides occurring in the process of synthesizing the above compound.

As described hereinabove, the electrode material according to the embodiment 2 is an electrode material that may be suitably used in an air electrode of an SOFC particularly when an electrolyte membrane includes a proton conductive electrolyte material. The electrode material according to the embodiment 2, however, may also be used as an electrode material for an SOFC in which an electrolyte material used in an electrolyte membrane is an oxide ion conductor.

Embodiment 3

FIG. 1A illustrates a sectional view of a membrane electrode assembly 10 according to embodiment 3. The membrane electrode assembly 10 includes an electrolyte membrane 11 and a first electrode 12. In other words, the electrolyte membrane 11 is provided on a first main surface 12a of the first electrode 12.

For example, the membrane electrode assembly 10 according to the embodiment 3 is used in a fuel cell. When the membrane electrode assembly 10 is used in a fuel cell, the first electrode 12 in the membrane electrode assembly 10 is, for example, an air electrode.

For example, the electrolyte membrane 11 is composed of a proton conductive electrolyte material (that is, a proton conductor). Examples of the proton conductors include compounds represented by the chemical formula $BaZr_{1-x1}M1_{x1}O_{3-\delta}$, compounds represented by the chemical formula $BaCe_{1-x2}M2_{x2}O_{3-\delta}$ and compounds represented by the chemical formula $BaZr_{1-x3-y3}Ce_{x3}M3_{y3}O_{3-\delta}$. Here, M1, M2 and M3 each include at least one selected from the group consisting of Pr, Nd, Pm, Sm, Eu, Gd, Tb, Dy, Ho, Er, Tm, Yb, Y, Sc, In and Lu, and $0<x1<1$, $0<x2<1$, $0<x3<1$, $0<y3<1$, and $0<\delta<0.5$ are satisfied. However, the proton conductors are not limited to those described above. For example, the electrolyte membrane 11 in the membrane electrode assembly 10 according to the embodiment 3 includes at least one selected from the group consisting of compounds represented by the chemical formula $BaZr_{1-x1}M1_{x1}O_{3-\delta}$, compounds represented by the chemical formula $BaCe_{1-x2}M2_{x2}O_{3-\delta}$ and compounds represented by the chemical formula $BaZr_{1-x3-y3}Ce_{x3}M3_{y3}O_{3-\delta}$. M1 may be Yb.

The membrane electrode assembly 10 provided according to the above configuration is composed of a material having excellent proton conductivity as an electrolyte, and an electrode material having excellent electrode characteristics.

The electrolyte membrane 11 may include a proton conductive material as described above, or may include an oxide ion conductor. Examples of the oxide ion conductors include yttria-stabilized zirconia, scandia-stabilized zirconia, gadolinium-doped ceria, and lanthanum strontium gallium magnesium composite oxide.

The thickness of the electrolyte membrane 11 is, for example, 1 to 500 μm, and may be 1 to 50 μm.

The first electrode 12 includes the electrode material described in the embodiment 1 or the embodiment 2. With this configuration, the membrane electrode assembly 10 according to the embodiment 3 can attain excellent electrode activity. The first electrode 12 may be composed solely of the electrode material described in the embodiment 1, or may be composed of, for example, a mixture of the electrode material according to the embodiment 1, and a metal or a metal oxide. The first electrode 12 may be composed solely of the electrode material described in the embodiment 2, or may be composed of, for example, a mixture of the electrode material according to the embodiment 2, and a metal or a metal oxide.

For example, the first electrode 12 has a thickness of 1 to 1000 μm. When the first electrode 12 also serves as a cell support, the thickness of the first electrode 12 may be 100 μm to 1000 μm. When the cell support is a member other than the first electrode 12, the thickness of the first electrode 12 may be 1 μm to 100 μm or may be 5 to 50 μm.

The electrode materials described in the embodiment 1 and the embodiment 2 have proton conductivity. Thus, when the electrolyte membrane 11 includes a proton conductor, the membrane electrode assembly 10 according to the embodiment 3 may be used as an air electrode and an electrolyte membrane in an SOFC in which the electrolyte membrane includes the proton conductive electrolyte material. When such a membrane electrode assembly 10 is used as an air electrode and an electrolyte membrane in an SOFC, useful reaction fields may be created in the SOFC not only at the contact face among the air electrode, the electrolyte membrane and oxygen (that is, at the air electrode-electrolyte membrane-oxygen three-phase interface) but also at the contact face between the air electrode and oxygen (that is, at the air electrode-oxygen two-phase interface). Thus, the membrane electrode assembly 10 according to the embodiment 3 may enhance the performance of an SOFC when the electrolyte membrane includes a proton conductive electrolyte material.

While FIG. 1A illustrates the electrolyte membrane 11 and the first electrode 12 as being in contact with each other, an additional layer may be provided between the electrolyte membrane 11 and the first electrode 12. For example, such an additional layer may be a functional layer. The functional layer is a layer that promotes the transfer of electrons or protons between the electrolyte membrane 11 and the first electrode 12. For example, the functional layer is composed of a composite of a cermet and a composite oxide.

For example, the electrolyte membrane 11 is produced by a tape casting method, a spin coating method, a dip coating method, sputtering or PLD (pulse laser deposition).

Embodiment 4

Figure 1B:
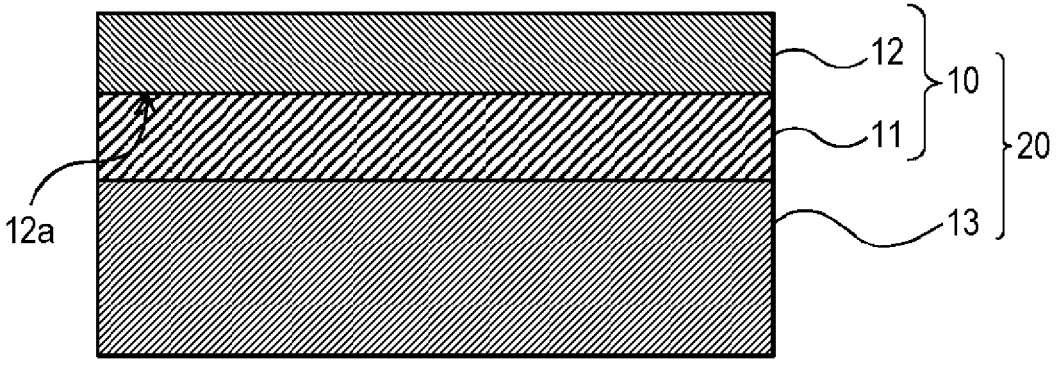
FIG. 1B illustrates a sectional view of an electrochemical cell according to embodiment 4.

FIG. 1B illustrates a sectional view of an electrochemical cell 20 according to embodiment 4.

The electrochemical cell 20 according to the embodiment 4 includes a membrane electrode assembly 10 and a second electrode 13. That is, the electrochemical cell 20 includes a first electrode 12, an electrolyte membrane 11 and a second electrode 13.

The membrane electrode assembly 10 is described in the embodiment 3.

In the electrochemical cell 20, as illustrated in FIG. 1B, the first electrode 12, the electrolyte membrane 11 and the second electrode 13 are arranged in the order named. That is, the electrolyte membrane 11 is sandwiched between the first electrode 12 and the second electrode 13. In other words, the electrolyte membrane 11 is provided between the first electrode 12 and the second electrode 13.

As a result of the above configuration, the electrochemical cell 20 according to the embodiment 4 can attain excellent electrode activity.

As described in the embodiment 3, the first electrode 12 in the membrane electrode assembly 10 may be an air electrode. That is, the second electrode 13 may be a fuel electrode. When the second electrode 13 functions as a fuel electrode, the second electrode 13 includes, for example, a metal oxide. For example, the second electrode 13 principally includes nickel oxide. For example, the second electrode 13 may be formed on the membrane electrode assembly 10 by a screen printing method. When the second electrode 13 functions as a fuel electrode, the second electrode 13 includes, for example, at least one selected from the group consisting of metals and metal oxides. For example, the second electrode 13 includes at least one selected from the group consisting of nickel (that is, Ni) and nickel oxide (that is, NiO). The electrochemical cell 20 provided according to this configuration can attain an excellent fuel electrode performance.

For example, the second electrode 13 may be formed on the membrane electrode assembly 10 by a tape casting method, a spin coating method, a dip coating method, sputtering, PLD or a screen printing method.

While FIG. 1B illustrates the second electrode 13 and the electrolyte membrane 11 as being in contact with each other, the arrangement is not limited thereto and an additional layer may be provided between the second electrode 13 and the electrolyte membrane 11.

For example, such an additional layer may be a functional layer. The functional layer is described in the embodiment 3.

The electrochemical cell 20 may be used in a fuel cell, an electrochemical hydrogen pump, a hydrogen sensor, and a water electrolyzer.

Embodiment 5

Figure 2:
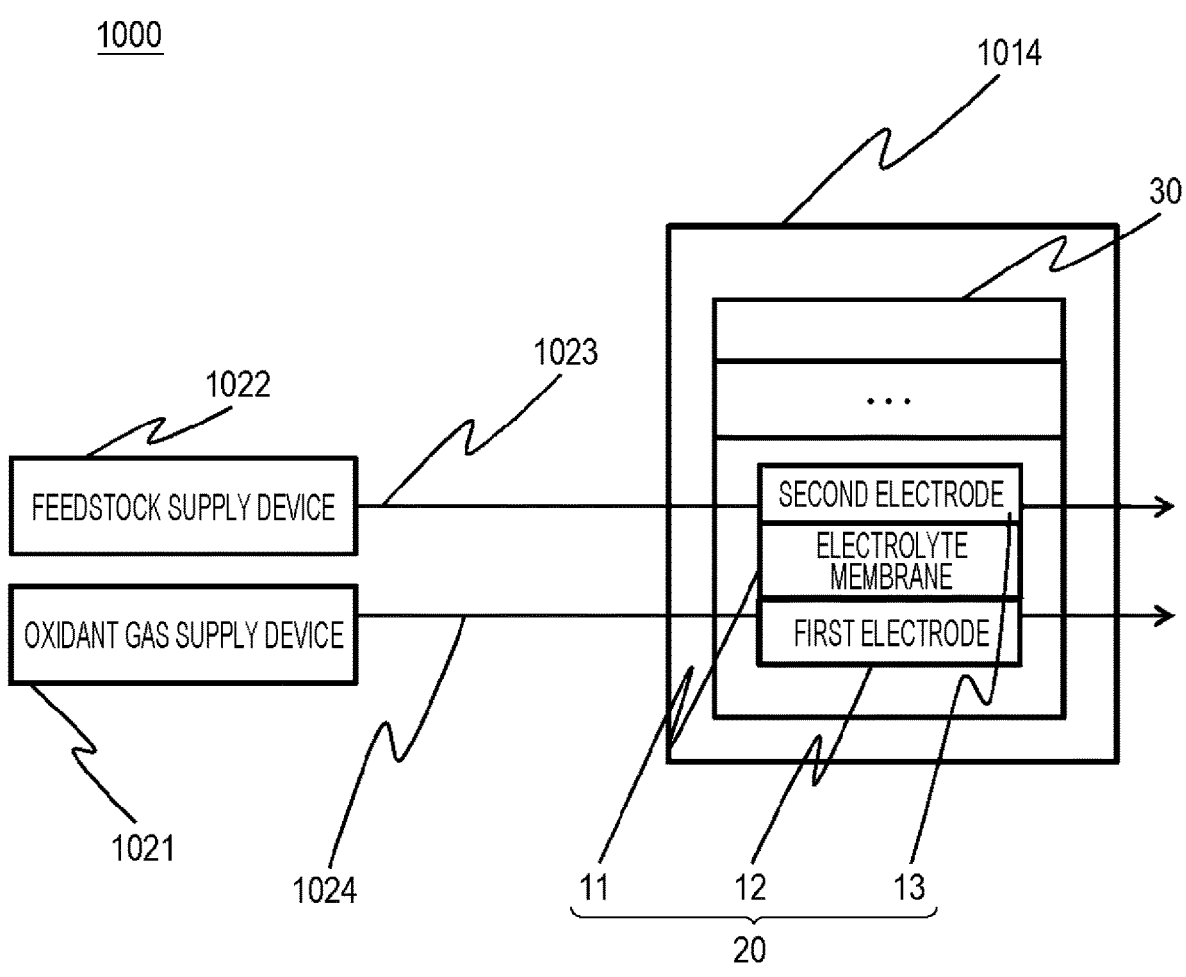
FIG. 2 illustrates a fuel cell system according to embodiment 5.

FIG. 2 schematically illustrates a fuel cell system 1000 according to embodiment 5.

The fuel cell system 1000 includes an electrochemical cell 20. The electrochemical cell 20 is described in the embodiment 4.

In the fuel cell system 1000 according to the embodiment 5, the electrochemical cell 20 is used as a fuel cell. Thus, in this case, the first electrode 12 functions as an air electrode, and the second electrode 13 functions as a fuel electrode.

The fuel cell system 1000 further includes an oxidant gas supply line 1024 and a feedstock gas supply line 1023. The oxidant gas supply line 1024 is connected to the first electrode 12 and an oxidant gas supply device 1021. The feedstock gas supply line 1023 is connected to the second electrode 13 and a feedstock supply device 1022.

The electrochemical cells 20 are stacked to form a stack 30. The stack 30 thus obtained is stored in a housing 1014.

The housing 1014 may be composed of a thermally insulating member. An oxidant gas is supplied to the first electrodes 12 in the stacked electrochemical cells 20.

Specifically, an oxidant gas is supplied from the oxidant gas supply device 1021 through the oxidant gas supply line 1024 to the first electrodes 12 (that is, the cathodes) in the electrochemical cells 20.

At the first electrode 12, the following reaction (1) proceeds:

$$O_2 + 4H^+ + 4e^- \rightarrow 2H_2O \qquad (1)$$

For example, the oxidant gas is air.

A feedstock is supplied from the feedstock supply device 1022 through the feedstock gas supply line 1023 to the second electrodes 13 in the electrochemical cells 20.

At the second electrode 13, the following reaction (2) proceeds:

$$2H_2 \rightarrow 4H^+ + 4e^- \qquad (2)$$

For example, the feedstock is hydrogen molecules.

Hydrogen may be produced by a reforming reaction. Alternatively, hydrogen may be produced by water electrolysis.

The fuel cell system 1000 is operated as described above, and the fuel cell system 1000 generates electricity.

The fuel cell system 1000 according to the embodiment 5 may function as a fuel cell that has excellent electrode activity at the air electrodes.

EXAMPLES

Hereinbelow, the present disclosure will be described in greater detail with reference to the following EXAMPLES and COMPARATIVE EXAMPLES. In EXAMPLES and COMPARATIVE EXAMPLES, electrode materials, membrane electrode assemblies including the electrodes, and electrochemical cells including the membrane electrode assemblies were produced as described below. The crystal structures of the respective electrode materials were analyzed, and characteristics of the membrane electrode assemblies and the electrochemical cells were evaluated.

Example 1

(Preparation of Electrode Material)

The following materials were provided as starting materials for an electrode material.

$BaCO_3$ (0.200 mol, manufactured by KANTO CHEMICAL CO., INC.)

$ZrO_2$ (0.075 mol, manufactured by KANTO CHEMICAL CO., INC.)

$In_2O_3$ (0.038 mol, manufactured by Kojundo Chemical Laboratory Co., Ltd.)

$Co_3O_4$ (0.017 mol, manufactured by KANTO CHEMICAL CO., INC.)

The above starting materials and 50 mL of distilled water were added to a 250 mL container. Next, the container was shaken using a planetary ball mill (manufactured by Fritsch) at 200 rpm for 10 minutes. This shaking operation was repeated twice. A mixture liquid was thus obtained. The mixture liquid obtained was dried in a dryer (MOV-212F, manufactured by Panasonic Corporation) at 120° C. for 6 hours to remove water from the mixture liquid. A solid was thus obtained. The solid obtained was crushed in a mortar, and the resultant powder was transferred to an alumina crucible (manufactured by NIKKATO CORPORATION). The alumina crucible was then heat-treated in an air atmosphere at a temperature of 1300° C. for 2 hours. An electrode material was thus obtained. Table 1 describes the values of x and y in the chemical formula $BaZr_{1-x-y}In_xCo_yO_{3-\delta}$ calculated from the starting materials.

(X-Ray Diffraction of Electrode Material)

The crystal structure of the electrode material obtained was analyzed with X-ray diffractometer "SmartLab" (manufactured by Rigaku Corporation). Specifically, CuKα radiation was used as the X-ray source, and the electrode material obtained was irradiated with the X-ray by a parallel beam method. The analysis confirmed that the synthesized oxide had the desired composition based on known peaks of $BaZrO_3$ (with reference to database: ICDD database).

(Production of Membrane Electrode Assembly)

Next, a method for producing a membrane electrode assembly will be described.

First, an electrolyte membrane was prepared using $BaZr_{0.8}Yb_{0.2}O_{3-\delta}$. Approximately 10 g of the electrolyte material $BaZr_{0.8}Yb_{0.2}O_{3-\delta}$ was introduced into a powder compaction die (having a diameter of 20 mm). Next, the electrolyte material $BaZr_{0.8}Yb_{0.2}O_{3-\delta}$ was pressed into a cylindrical shape using a hydraulic pump to give a pellet. The pellet obtained was placed into a bag and packed. The pellet was pressurized by a cold isostatic pressing (namely, "CIP") method at 200 MPa for 3 minutes. A compact was thus obtained. The compact obtained was heat-treated in an air atmosphere at 1750° C. for 24 hours to give a sintered product. The sintered product obtained was polished with a lapping film (manufactured by 3M Company) having a grain size of 15 microns. After being polished, the sintered product had a thickness of about 500 μm. An electrolyte membrane was thus produced. The electrolyte membrane had two main surfaces (namely, a first main surface and a second main surface).

Next, a first electrode was prepared. A paste containing the electrode material obtained by the method described hereinabove was prepared as follows to produce a first electrode by applying the electrode material to the first main surface of the electrolyte membrane.

The following materials were provided as starting materials for the paste.

Electrode material 20 g

EC vehicle (manufactured by NISSIN-KASEI CO., LTD.) 13.3 g

The electrode material and the EC vehicle were added to a plastic container. The container was shaken using a planetary mixer at 1000 rpm for 5 minutes. A paste precursor was thus obtained. The paste precursor obtained was dispersed using a three-roll mill (trade name: BR-100VIII, manufactured by AIMEX CO., Ltd.). An electrode dispersion was thus obtained.

The electrode dispersion obtained was printed by a screen printing method onto the center of the first main surface of the electrolyte membrane produced as described hereinabove. The first electrode thus produced was circular and had a diameter of 10 mm. A membrane electrode assembly was thus produced.

(Fabrication of Evaluation Cell)

Next, a method will be described for the fabrication of an evaluation cell for evaluating the electrode activity.

First, an evaluation membrane electrode assembly was produced using the membrane electrode assembly produced by the method described hereinabove.

The electrode dispersion was printed also onto the second main surface of the electrolyte membrane constituting the membrane electrode assembly. Next, the membrane electrode assembly on which the electrode dispersion was printed was heat-treated in an air atmosphere at 1000° C. (hereinafter, referred to as the "electrode baking temperature") for 2 hours. An evaluation membrane electrode assembly was thus obtained.

Next, an evaluation cell was fabricated using the evaluation membrane electrode assembly obtained. A technique described below was adopted to evaluate the electrode activity of the evaluation membrane electrode assembly that was fabricated. The following were provided for the preparation of an evaluation cell.

Evaluation membrane electrode assembly

Silver ink (manufactured by TOYO Corporation)

The silver ink was printed by a screen printing method onto the electrodes on both sides of the evaluation membrane electrode assembly. An evaluation cell precursor was thus obtained. The silver ink that was printed had a diameter of 10 mm. The evaluation cell precursor obtained was heat-treated in an air atmosphere at 800° C. for 1 hour. An evaluation cell was thus fabricated.

(Measurement of Reaction Resistance Using Evaluation Cell)

The reaction resistance of the evaluation cell was measured.

Air that had been humidified so that the dew point temperature would be 20° C. was flowed (flow rate: 100 mL/min) through the evaluation cell, and the reaction resistance of the evaluation cell was measured based on an AC impedance method performed at a temperature of 600° C.

Specifically, using ModuLab XM ECS (manufactured by Solartron Analytical), AC signals with an amplitude of 10 mV were applied to the cell in the range of 1 MHz to 0.01 Hz. With respect to the arc drawn in the Nyquist plot in the range of frequencies of about 100 kHz to 0.01 Hz, a real number was obtained from the intersection of the arc and the real axis on the high frequency side to the end on the low frequency side. In a fuel cell, the reaction resistance acquired by the AC impedance method usually shows two separate semicircular waveforms for the positive electrode and the negative electrode. The evaluation cell used in this measurement, however, had the same materials on both sides. Therefore, the results obtained in this measurement are an overlap of the current responses of the air electrodes. Thus, the real number was halved to consider the electrode activity per side, and the halved real number was taken as the reaction resistance. Incidentally, the reaction resistance is an energy loss required for electron transfer in an electrochemical reaction at an electrode. The resistance that was calculated probably had correlation with the activity of the electrode. Thus, the electrode activity was evaluated as good or poor based on the magnitude of the resistance calculated.

The following is a reference to the specific procedures for evaluating the reaction resistance.

(i) When the arc drawn in the Nyquist plot in the range of frequencies of about 100 kHz to 0.01 Hz had an intersection of the arc and the real axis on the high frequency side (for example, $I_1$ illustrated in FIG. 8): A real number (for example, R1 illustrated in FIG. 8) was obtained from the intersection of the arc and the real axis on the high frequency side to the end on the low frequency side (for example, 12 illustrated in FIG. 8). The real number was taken as the reaction resistance.

(ii) When the arc drawn in the Nyquist plot in the range of frequencies of about 100 kHz to 0.01 Hz had no intersection of the arc and the real axis on the high frequency side: A real number (for example, R2 illustrated in FIG. 9) was obtained from the minimum point of the arc to the end on the low frequency side. The real number was taken as the reaction resistance.

Example 2

In EXAMPLE 2, electrode materials, membrane electrode assemblies and evaluation cells were produced, and the crystal structures of the electrode materials were analyzed in the same manner as in EXAMPLE 1 except for the following items (1) and (2).

(1) The starting materials for the electrode material were changed to the following materials.

$BaCO_3$ (0.200 mol, manufactured by KANTO CHEMICAL CO., INC.)

$ZrO_2$ (0.050 mol, manufactured by KANTO CHEMICAL CO., INC.)

$In_2O_3$ (0.013 mol, manufactured by Kojundo Chemical Laboratory Co., Ltd.)

$Co_3O_4$ (0.042 mol, manufactured by KANTO CHEMICAL CO., INC.)

(2) The heat treatment of the electrode material was performed at temperatures of 1100° C., 1200° C. and 1300° C.

Example 3

In EXAMPLE 3, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

$BaCO_3$ (0.200 mol, manufactured by KANTO CHEMICAL CO., INC.)

$ZrO_2$ (0.150 mol, manufactured by KANTO CHEMICAL CO., INC.)

In$_2$O$_3$ (0.013 mol, manufactured by Kojundo Chemical Laboratory Co., Ltd.)

Co$_3$O$_4$ (0.008 mol, manufactured by KANTO CHEMICAL CO., INC.)

Example 4

In EXAMPLE 4, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.125 mol, manufactured by KANTO CHEMICAL CO., INC.)

In$_2$O$_3$ (0.012 mol, manufactured by Kojundo Chemical Laboratory Co., Ltd.)

Co$_3$O$_4$ (0.017 mol, manufactured by KANTO CHEMICAL CO., INC.)

Example 5

In EXAMPLE 5, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.100 mol, manufactured by KANTO CHEMICAL CO., INC.)

In$_2$O$_3$ (0.012 mol, manufactured by Kojundo Chemical Laboratory Co., Ltd.)

Co$_3$O$_4$ (0.025 mol, manufactured by KANTO CHEMICAL CO., INC.)

Example 6

In EXAMPLE 6, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.075 mol, manufactured by KANTO CHEMICAL CO., INC.)

In$_2$O$_3$ (0.013 mol, manufactured by Kojundo Chemical Laboratory Co., Ltd.)

Co$_3$O$_4$ (0.033 mol, manufactured by KANTO CHEMICAL CO., INC.)

Example 7

In EXAMPLE 7, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.025 mol, manufactured by KANTO CHEMICAL CO., INC.)

In$_2$O$_3$ (0.012 mol, manufactured by Kojundo Chemical Laboratory Co., Ltd.)

Co$_3$O$_4$ (0.050 mol, manufactured by KANTO CHEMICAL CO., INC.)

Example 8

In EXAMPLE 8, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.125 mol, manufactured by KANTO CHEMICAL CO., INC.)

In$_2$O$_3$ (0.025 mol, manufactured by Kojundo Chemical Laboratory Co., Ltd.)

Co$_3$O$_4$ (0.083 mol, manufactured by KANTO CHEMICAL CO., INC.)

Example 9

In EXAMPLE 9, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.100 mol, manufactured by KANTO CHEMICAL CO., INC.)

In$_2$O$_3$ (0.025 mol, manufactured by Kojundo Chemical Laboratory Co., Ltd.)

Co$_3$O$_4$ (0.017 mol, manufactured by KANTO CHEMICAL CO., INC.)

Example 10

In EXAMPLE 10, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.075 mol, manufactured by KANTO CHEMICAL CO., INC.)

In$_2$O$_3$ (0.025 mol, manufactured by Kojundo Chemical Laboratory Co., Ltd.)

Co$_3$O$_4$ (0.025 mol, manufactured by KANTO CHEMICAL CO., INC.)

Example 11

In EXAMPLE 11, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.050 mol, manufactured by KANTO CHEMICAL CO., INC.)

In$_2$O$_3$ (0.025 mol, manufactured by Kojundo Chemical Laboratory Co., Ltd.)

Co$_3$O$_4$ (0.033 mol, manufactured by KANTO CHEMICAL CO., INC.)

Example 12

In EXAMPLE 12, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.025 mol, manufactured by KANTO CHEMICAL CO., INC.)

In$_2$O$_3$ (0.025 mol, manufactured by Kojundo Chemical Laboratory Co., Ltd.)

Co$_3$O$_4$ (0.042 mol, manufactured by KANTO CHEMICAL CO., INC.)

Example 13

In EXAMPLE 13, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.100 mol, manufactured by KANTO CHEMICAL CO., INC.)

In$_2$O$_3$ (0.038 mol, manufactured by Kojundo Chemical Laboratory Co., Ltd.)

Co$_3$O$_4$ (0.008 mol, manufactured by KANTO CHEMICAL CO., INC.)

Example 14

In EXAMPLE 14, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.050 mol, manufactured by KANTO CHEMICAL CO., INC.)

In$_2$O$_3$ (0.038 mol, manufactured by Kojundo Chemical Laboratory Co., Ltd.)

Co$_3$O$_4$ (0.025 mol, manufactured by KANTO CHEMICAL CO., INC.)

Example 15

In EXAMPLE 15, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.025 mol, manufactured by KANTO CHEMICAL CO., INC.)

In$_2$O$_3$ (0.038 mol, manufactured by Kojundo Chemical Laboratory Co., Ltd.)

Co$_3$O$_4$ (0.033 mol, manufactured by KANTO CHEMICAL CO., INC.)

Example 16

In EXAMPLE 16, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.075 mol, manufactured by KANTO CHEMICAL CO., INC.)

In$_2$O$_3$ (0.050 mol, manufactured by Kojundo Chemical Laboratory Co., Ltd.)

Co$_3$O$_4$ (0.008 mol, manufactured by KANTO CHEMICAL CO., INC.)

Example 17

In EXAMPLE 17, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

BaCO$_3$ (0.200 mol, manufactured by KANTO CHEMICAL CO., INC.)

ZrO$_2$ (0.050 mol, manufactured by KANTO CHEMICAL CO., INC.)

In$_2$O$_3$ (0.050 mol, manufactured by Kojundo Chemical Laboratory Co., Ltd.)

$Co_3O_4$ (0.017 mol, manufactured by KANTO CHEMI-CAL CO., INC.)

Example 18

In EXAMPLE 18, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

$BaCO_3$ (0.200 mol, manufactured by KANTO CHEMI-CAL CO., INC.)

$ZrO_2$ (0.025 mol, manufactured by KANTO CHEMICAL CO., INC.)

$In_2O_3$ (0.050 mol, manufactured by Kojundo Chemical Laboratory Co., Ltd.)

$Co_3O_4$ (0.025 mol, manufactured by KANTO CHEMI-CAL CO., INC.)

Example 19

In EXAMPLE 19, an electrode material, a membrane electrode assembly and an evaluation cell were produced, the crystal structure of the electrode material was analyzed, and the reaction resistance of the evaluation cell was measured in the same manner as in EXAMPLE 1 except for the following item (1).

(1) The starting materials for the electrode material were changed to the following materials.

$BaCO_3$ (0.200 mol, manufactured by KANTO CHEMI-CAL CO., INC.)

$ZrO_2$ (0.050 mol, manufactured by KANTO CHEMICAL CO., INC.)

$In_2O_3$ (0.063 mol, manufactured by Kojundo Chemical Laboratory Co., Ltd.)

$Co_3O_4$ (0.008 mol, manufactured by KANTO CHEMI-CAL CO., INC.)

Example 20

In EXAMPLE 20, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

$BaCO_3$ (0.200 mol, manufactured by KANTO CHEMI-CAL CO., INC.)

$ZrO_2$ (0.025 mol, manufactured by KANTO CHEMICAL CO., INC.)

$In_2O_3$ (0.062 mol, manufactured by Kojundo Chemical Laboratory Co., Ltd.)

$Co_3O_4$ (0.017 mol, manufactured by KANTO CHEMI-CAL CO., INC.)

Example 21

In EXAMPLE 21, an electrode material, a membrane electrode assembly and an evaluation cell were produced, and the crystal structure of the electrode material was analyzed in the same manner as in EXAMPLE 1 except for the following item (1).

(1) The starting materials for the electrode material were changed to the following materials.

$BaCO_3$ (0.200 mol, manufactured by KANTO CHEMI-CAL CO., INC.)

$ZrO_2$ (0.025 mol, manufactured by KANTO CHEMICAL CO., INC.)

$In_2O_3$ (0.075 mol, manufactured by Kojundo Chemical Laboratory Co., Ltd.)

$Co_3O_4$ (0.008 mol, manufactured by KANTO CHEMI-CAL CO., INC.)

Comparative Example 1

In COMPARATIVE EXAMPLE 1, an electrode material, a membrane electrode assembly and an evaluation cell were produced, the crystal structure of the electrode material was analyzed, and the reaction resistance of the evaluation cell was measured in the same manner as in EXAMPLE 1 except for the following items (1) and (2).

(1) The starting materials for the electrode material were changed to the following materials.

$BaCO_3$ (0.200 mol, manufactured by KANTO CHEMI-CAL CO., INC.)

$ZrO_2$ (0.160 mol, manufactured by KANTO CHEMICAL CO., INC.)

$In_2O_3$ (0.020 mol, manufactured by Kojundo Chemical Laboratory Co., Ltd.)

(2) The heat treatment temperature of the electrode material was 1400° C.

Comparative Example 2

In COMPARATIVE EXAMPLE 2, an electrode material, a membrane electrode assembly and an evaluation cell were produced, the crystal structure of the electrode material was analyzed, and the reaction resistance of the evaluation cell was measured in the same manner as in EXAMPLE 1 except for the following items (1) and (2).

(1) The starting materials for the electrode material were changed to the following material.

$La_{0.6}Sr_{0.4}Co_{0.2}Fe_{0.8}O_{3-\delta}$ (manufactured by KUSAKA RARE METAL PRODUCTS CO., LTD.)

(2) The heat treatment of the electrode material was performed at 950° C.

(Experimental Results and Discussion)

(X-Ray Diffraction Profiles and Identification of Synthesized Compounds)

X-ray diffraction profiles of the electrode materials of EXAMPLES 1 to 21, COMPARATIVE EXAMPLE 1 and COMPARATIVE EXAMPLE 2, and the compounds synthesized will be discussed with reference to FIG. 3 to FIG. 7 and Table 1.

Figure 3:
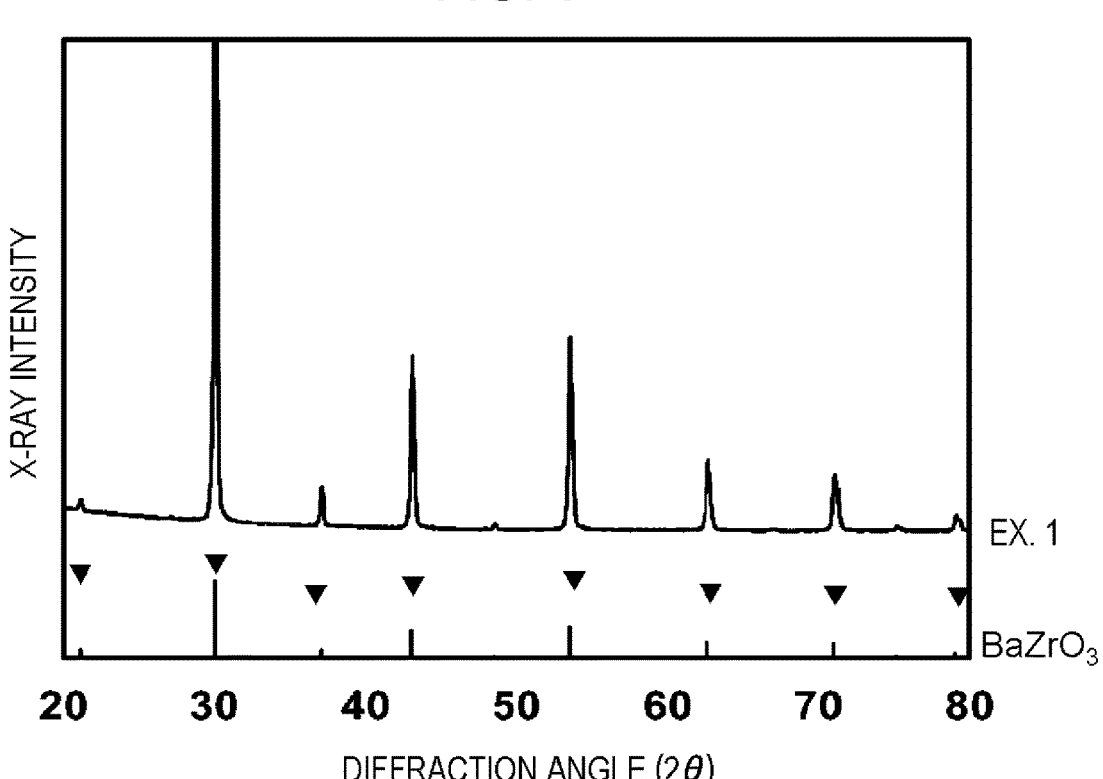
FIG. 3 is a graph illustrating an X-ray diffraction profile of an electrode material of EXAMPLE 1.
Figure 4:
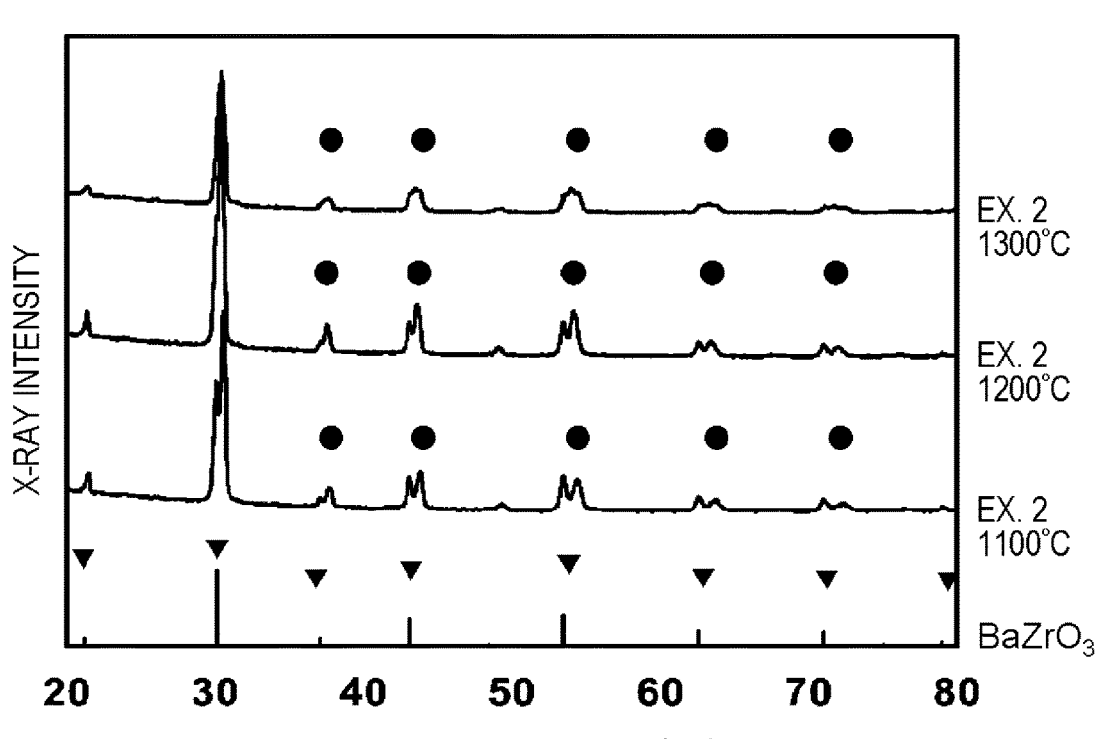
FIG. 4 is a graph illustrating X-ray diffraction profiles of electrode materials of EXAMPLE 2.

FIG. 3 is a graph illustrating an X-ray diffraction profile of the electrode material of EXAMPLE 1. FIG. 4 is a graph illustrating X-ray diffraction profiles of the electrode materials of EXAMPLE 2. In FIG. 3 and FIG. 4, the abscissa and the ordinate indicate the diffraction angle (namely, 2θ) and the X-ray intensity, respectively.

As illustrated in FIG. 3, the peaks of the electrode material of EXAMPLE 1 were similar to the peaks assigned to $BaZrO_3$ having a perovskite structure (database: ICDD, see the black down-pointing triangles in FIG. 3). In other words, the peaks of the electrode material produced by the method according to EXAMPLE 1 had shifts of about +2 degrees at a maximum from the peaks assigned to $BaZrO_3$. These shifts probably stem from the solid dissolution of Co and In in the starting materials into the crystals of $BaZrO_3$. It was thus revealed that the electrode material of EXAMPLE 1 was composed of a compound with a perovskite-type structure represented by $BaZr_{0.375}In_{0.375}Co_{0.25}O_{3-\delta}$, namely, was composed of a single compound. In other words, it was revealed that the electrode material of EXAMPLE 1 was composed of a compound free from starting material-derived impurities. As illustrated in FIG. 3, the peaks assigned to $BaZrO_3$ that were used were peaks at $2\theta=21.1, 30.1, 37.1, 43.1, 53.5, 62.6, 71.0$ and $79.0$ (specifically, eight peaks having a relatively high intensity ratio among the peaks assigned to $BaZrO_3$). As discussed above, the electrode material of EXAMPLE 1 is composed of a single compound.

On the other hand, as illustrated in FIG. 4, the peaks of the electrode materials of EXAMPLE 2 included peaks that did not correspond to the eight peaks assigned to $BaZrO_3$. For example, the electrode materials of EXAMPLE 2 had a peak at $2\theta=$about $45.0$ that was not seen in $BaZrO_3$. The black dots illustrated in FIG. 4 are examples of the peaks not corresponding to $BaZrO_3$. These peaks are probably assigned to oxides derived from the starting materials and also to the starting materials for $In_2O_3$. Based on the presence of peaks not corresponding to $BaZrO_3$, the product synthesized in EXAMPLE 2 was identified as a mixture including $BaZr_{1-x-y}In_xCo_yO_{3-\delta}$ ($0<x<1, 0<y<1, 0<(x+y)<1, 0<\delta<1$), oxides derived from the starting materials, and the starting materials for $In_2O_3$.

Figure 5:
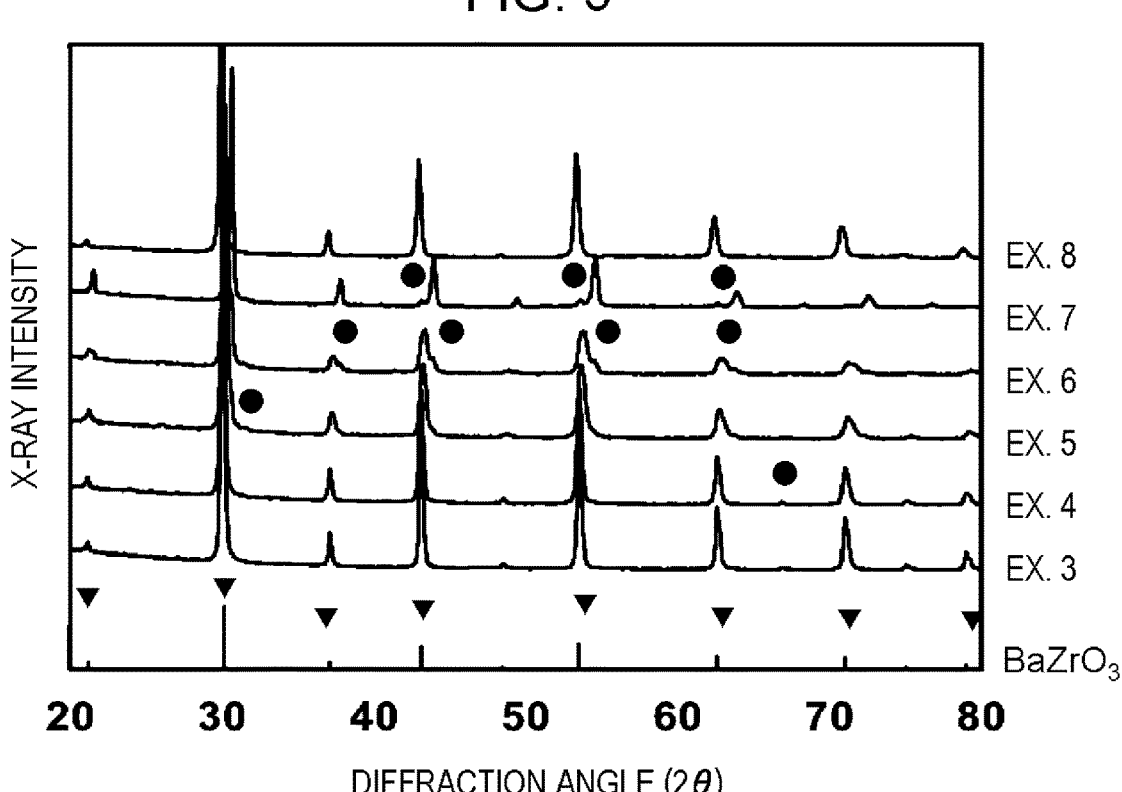
FIG. 5 is a graph illustrating X-ray diffraction profiles of electrode materials of EXAMPLES 3 to 8.
Figure 6:
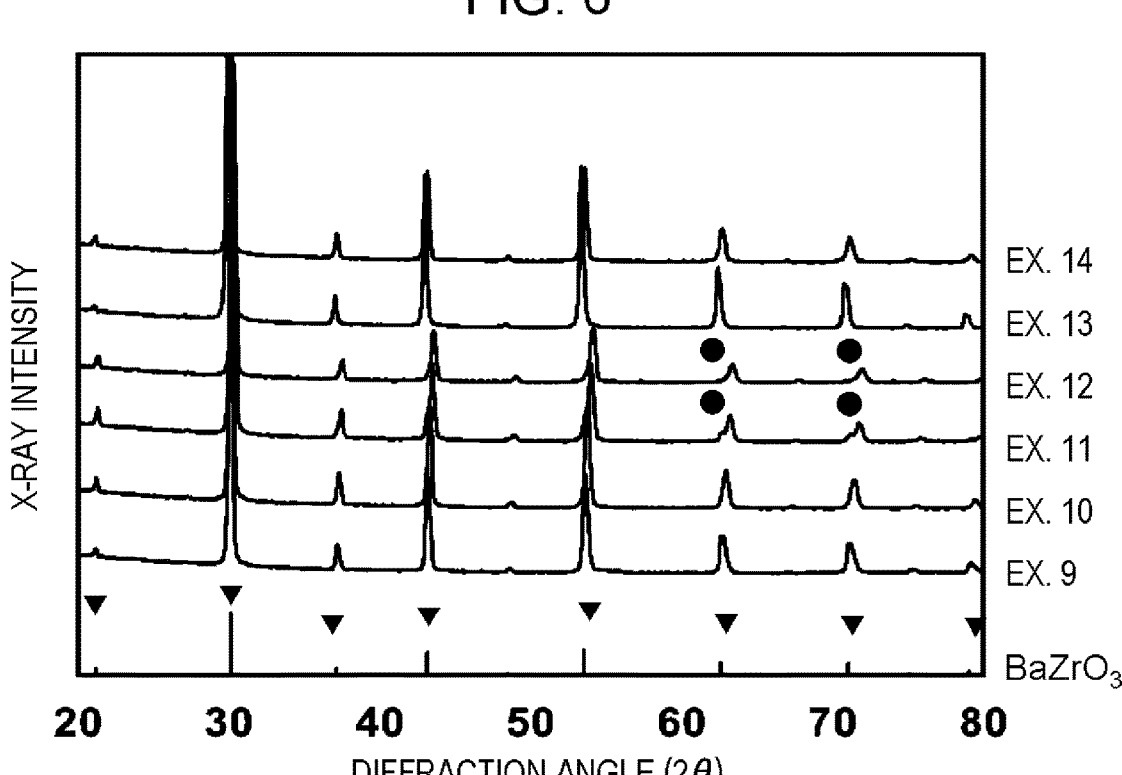
FIG. 6 is a graph illustrating X-ray diffraction profiles of electrode materials of EXAMPLES 9 to 14.
Figure 7:
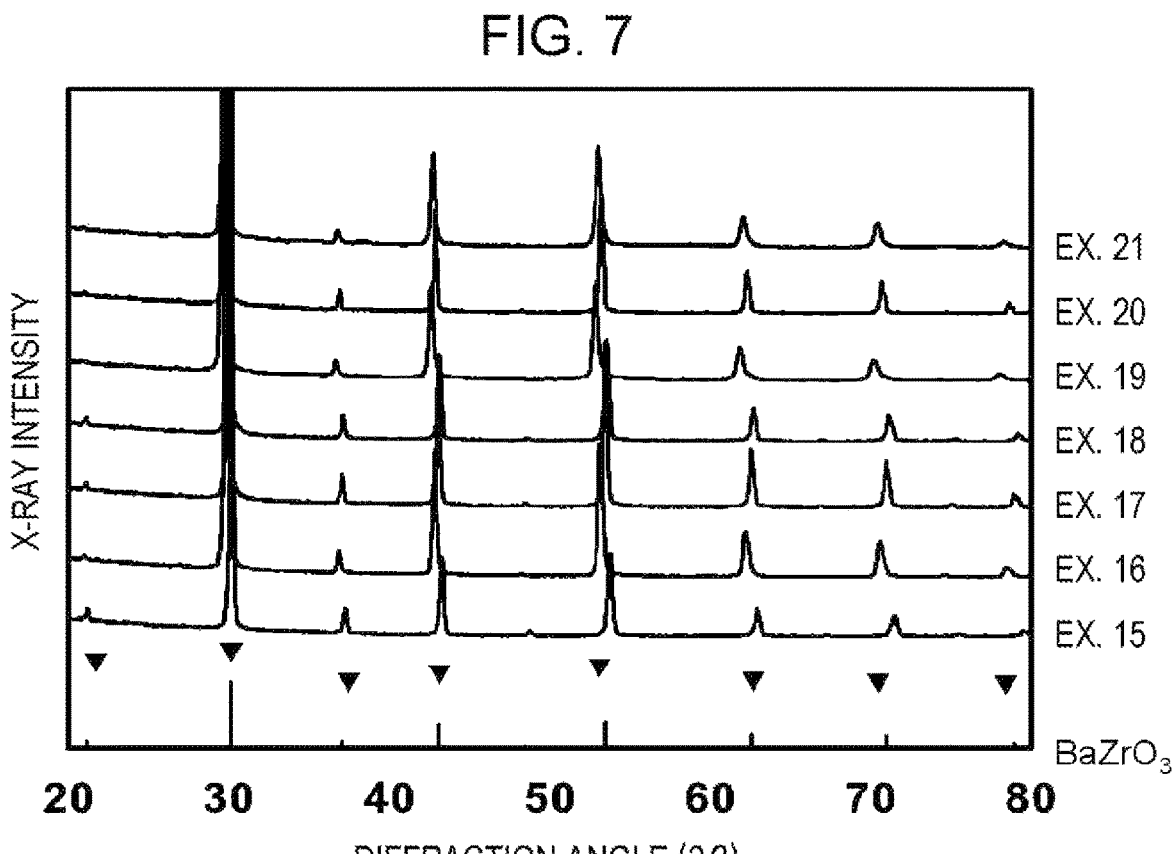
FIG. 7 is a graph illustrating X-ray diffraction profiles of electrode materials of EXAMPLES 15 to 21.

FIG. 5 is a graph illustrating X-ray diffraction profiles of the electrode materials of EXAMPLES 3 to 8. FIG. 6 is a graph illustrating X-ray diffraction profiles of the electrode materials of EXAMPLES 9 to 14. In FIG. 5 and FIG. 6, the abscissa and the ordinate indicate the diffraction angle (namely, $2\theta$) and the X-ray intensity, respectively.

The X-ray diffraction profiles of the electrode materials of EXAMPLES 3 to 14 were analyzed by the same method as described hereinabove. The synthesized compounds present in the electrode materials of EXAMPLES 3 to 14 were identified. The black dots illustrated in FIGS. 5 and 6 are examples of peaks not corresponding to $BaZrO_3$.

Table 1 describes whether the electrode materials of EXAMPLES and COMPARATIVE EXAMPLES are composed of a single compound or are mixtures containing a plurality of compounds. In Table 1, the white dots (namely, ○) indicate that the electrode material was determined to be composed of a single compound. In Table 1, the x symbols indicate that the electrode material was determined not to be composed of a single compound (that is, to be composed of a mixture).

An electrode material may be a mixture of a plurality of compounds. An electrode including such an electrode material can function as an electrode. However, an electrode that is composed of an electrode material containing a plurality of compounds has less reaction regions than an electrode that includes an electrode material composed of a single compound.

Thus, an electrode material including a single compound is desirable, as is the case for the electrode material illustrated in EXAMPLE 1.

(Evaluation of Reaction Resistance of Cells of Example 1 and Comparative Example 1)

The results of the evaluation of the reaction resistance of the cells of EXAMPLE 1 and COMPARATIVE EXAMPLE 1 will be discussed with reference to FIG. 8 and FIG. 9.

Figure 8:
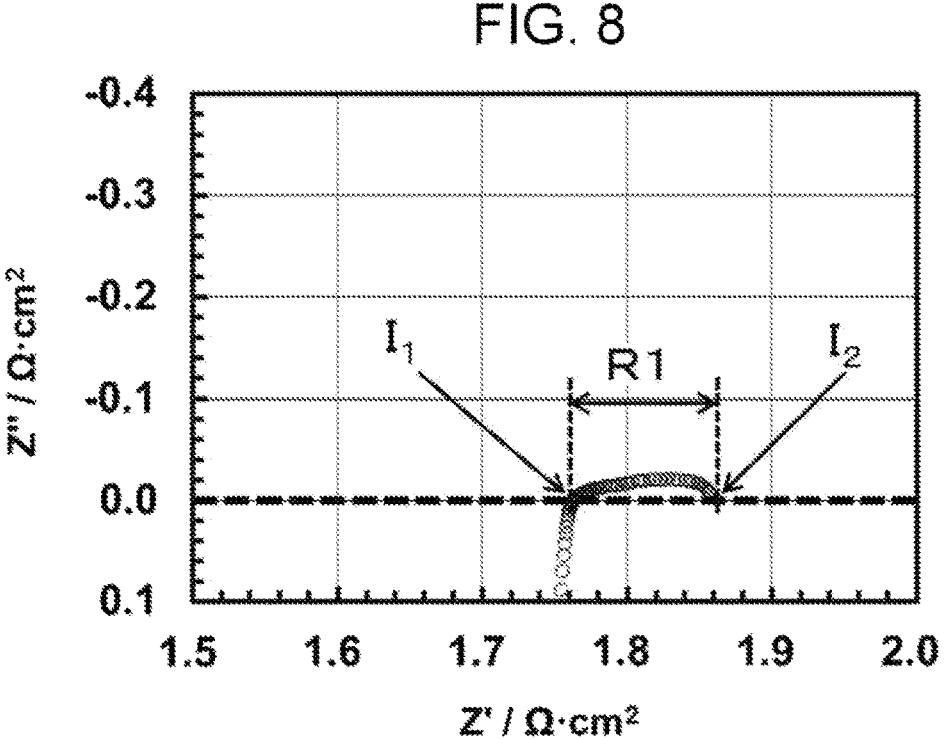
FIG. 8 illustrates a Nyquist plot of an evaluation cell using the electrode material of EXAMPLE 1.

FIG. 8 illustrates a Nyquist plot of the evaluation cell using the electrode material of EXAMPLE 1. FIG. 9 illustrates a Nyquist plot of the evaluation cell using the electrode material of COMPARATIVE EXAMPLE 1. Specifically, FIG. 8 and FIG. 9 illustrate Nyquist plot data obtained by testing the cells of EXAMPLE 1 and COMPARATIVE EXAMPLE 1 by an AC impedance method, respectively.

As illustrated in FIG. 8, a real number (see R1 in FIG. 8) was calculated from the intersection (see $I_1$ in FIG. 8) of the real axis (see the broken line in FIG. 8, that is, y=0) and the high frequency side of the arc drawn with the change in frequency, to the end on the low frequency side (see $I_2$ in FIG. 8). The value obtained by halving the real number R1 is the reaction resistance (unit: $\Omega cm^2$).

Figures 9, 10:
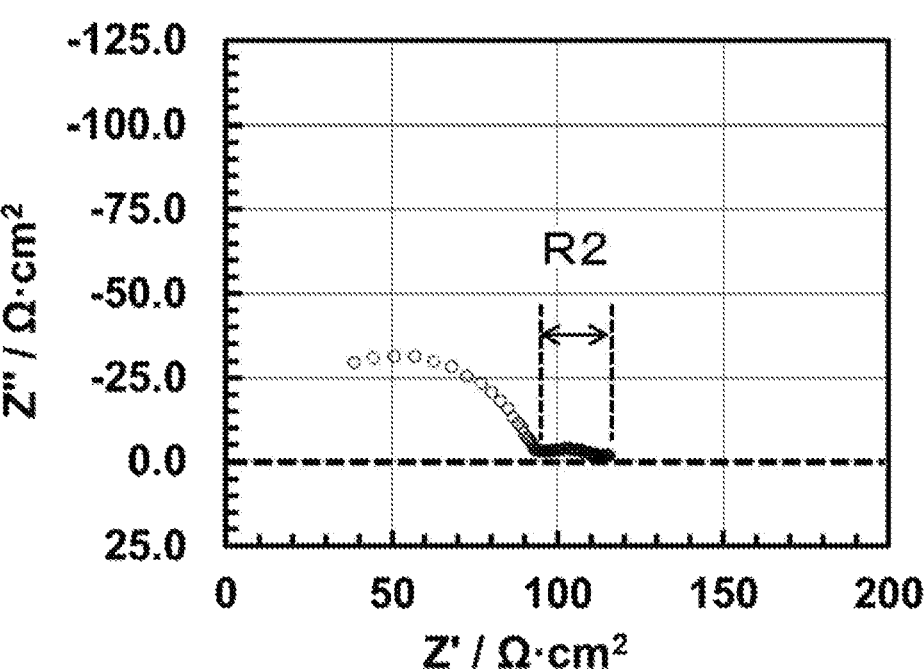
FIG. 9 illustrates a Nyquist plot of an evaluation cell using an electrode material of COMPARATIVE EXAMPLE 1.
FIG. 10 illustrates a Nyquist plot of an evaluation cell using an electrode material of COMPARATIVE EXAMPLE 2.

As illustrated in FIG. 9, the Nyquist plot for COMPARATIVE EXAMPLE 1 does not have an intersection between the real axis and the arc drawn with the change in frequency. In this case, as illustrated in FIG. 9, a real number (see R2 in FIG. 9) was calculated from the minimum point to the end on the low frequency side. The value obtained by halving the real number R2 was taken as the reaction resistance.

From the reading of FIG. 8 and FIG. 9, the reaction resistance of the cell of EXAMPLE 1 is clearly lower than that of the cell of COMPARATIVE EXAMPLE 1. That is, the electrode in the cell of EXAMPLE 1 has an excellent performance. The reason behind this is probably because Co contained in the electrode material of EXAMPLE 1 functioned as an electrode active site. In contrast, as illustrated in FIG. 9, the electrode material of COMPARATIVE EXAMPLE 1 has a low function as an electrode.

As discussed above, the addition of Co to a compound represented by the chemical formula $BaZr_{1-x}In_xO_{3-\delta}$ (wherein $0<x<1$ and $0<\delta<0.5$) that is a conventional proton conductive electrolyte material will result in an electrode material offering advantageous effects. Since Co is a transition metal, the addition of Co may raise the value of $\delta$ to greater than or equal to 0.5.

(Evaluation of Reaction Resistance of Cells of Example 1 and Comparative Example 2)

The results of the evaluation of the reaction resistance of the cells of EXAMPLE 1 and COMPARATIVE EXAMPLE 2 will be discussed with reference to FIG. 8, FIG. 10 and Table 1.

FIG. 10 illustrates a Nyquist plot of the evaluation cell using the electrode material of COMPARATIVE EXAMPLE 2. Specifically, FIG. 10 illustrates Nyquist plot data obtained by testing the cell of COMPARATIVE EXAMPLE 2 by an AC impedance method. The electrode material of COMPARATIVE EXAMPLE 2 is an oxide ion-electron mixed conductor known to have excellent electrode activity. The electrode material of COMPARATIVE EXAMPLE 2 is a material frequently used in an SOFC air electrode.

The Nyquist plot of the cell of COMPARATIVE EXAMPLE 2 showed a similar tendency as the Nyquist plot of the cell of EXAMPLE 1. Specifically, the values of resistance showed a tendency to draw a semicircle as the frequency of the applied AC signals was changed from high frequency to low frequency.

The reaction resistance of the cell of EXAMPLE 1 was $0.05 \Omega cm^2$. On the other hand, the reaction resistance of the cell of COMPARATIVE EXAMPLE 2 was $0.49 \Omega cm^2$. The reaction resistance of the cell of EXAMPLE 1 was lower than the reaction resistance of the cell of COMPARATIVE EXAMPLE 2. Thus, the use of the cell of EXAMPLE 1 is expected to offer high electrode activity in various electrochemical devices. The electrode material of EXAMPLE 1 is expected to offer a high output when used in a fuel cell.

(Summary and Discussion)

The evaluation results of the cells of EXAMPLES 1 to 21, COMPARATIVE EXAMPLE 1 and COMPARATIVE EXAMPLE 2 will be discussed with reference to Table 1.

As described in Table 1, the electrode materials that included a compound represented by the chemical formula $BaZr_{1-x-y}In_xCo_yO_{3-\delta}$ (wherein $0<x<1$, $0<y<1$, $(x+y)<1$, and $0<\delta<1$) were synthesized as an electrode material composed of the above compound as a single compound or were synthesized as an electrode material composed of a mixture of the above compound and other compounds, depending on the values of x and y. Depending on the composition, the electrode materials that included a compound represented by the chemical formula $BaZr_{1-x-y}In_xCo_yO_{3-\delta}$ ($0<x<1$, $0<y<1$, $(x+y)<1$, and $0<\delta<1$) had a reaction resistance lower than the reaction resistance of the electrode material of COMPARATIVE EXAMPLE 2. Specifically, it has been found that the electrode material of the present disclosure may achieve a lower reaction resistance than the conventional electrode material having excellent electrode activity as an oxide ion-electron mixed conductor. More specifically, the values of reaction resistance of the electrode materials of EXAMPLE 1, EXAMPLE 9, EXAMPLE 10, EXAMPLE 14, EXAMPLE 16 and EXAMPLE 17 were lower than the reaction resistance of the electrode material of COMPARATIVE EXAMPLE 2. The reason is probably because the electrode materials of EXAMPLE 1, EXAMPLE 9, conductivity, the reaction also proceeds at the surface of the electrode particles (that is, also at the two-phase interface). Provided that the cell sizes are the same, the area of the three-phase interface is generally smaller than the area of the two-phase interface. Thus, as is the case in EXAMPLE 1, the electrode material of the present disclosure used in a cell including a proton conductive electrolyte membrane allows the cell to exhibit a superior electrode performance. The use of cells including the electrode materials of EXAMPLE 1, EXAMPLE 9, EXAMPLE 10, EXAMPLE 14, EXAMPLE 16 and EXAMPLE 17 is expected to offer high electrode activity in various electrochemical devices. The electrode materials of EXAMPLE 1, EXAMPLE 9, EXAMPLE 10, EXAMPLE 14, EXAMPLE 16 and EXAMPLE 17 are expected to offer a high output when used in a fuel cell. The values of reaction resistance of the electrode materials of EXAMPLE 1, EXAMPLE 9 and EXAMPLE 14 were lower than 0.13. Thus, the use of cells including the electrode materials of EXAMPLE 1, EXAMPLE 9 and EXAMPLE 14 is expected to offer higher electrode activity in various electrochemical devices. The electrode materials of EXAMPLE 1, EXAMPLE 9 and EXAMPLE 14 are expected to offer a higher output when used in a fuel cell.

TABLE 1

| | Compound | | | Single | Reaction resistance |
| --- | --- | --- | --- | --- | --- |
| | Composition | Value of x | Value of y | compound | [$\Omega cm^2$] |
| EX. 1 | $BaZr_{(1-x-y)}In_xCo_yO_{3-\delta}$ | 0.375 | 0.250 | ○ | 0.05 |
| EX. 2 | Ditto | 0.125 | 0.625 | X | — |
| EX. 3 | Ditto | 0.125 | 0.125 | ○ | 5.76 |
| EX. 4 | Ditto | 0.125 | 0.250 | X | — |
| EX. 5 | Ditto | 0.125 | 0.375 | X | — |
| EX. 6 | Ditto | 0.125 | 0.500 | X | — |
| EX. 7 | Ditto | 0.125 | 0.750 | X | — |
| EX. 8 | Ditto | 0.250 | 0.125 | ○ | 1.44 |
| EX. 9 | Ditto | 0.250 | 0.250 | ○ | 0.12 |
| EX. 10 | Ditto | 0.250 | 0.375 | ○ | 0.44 |
| EX. 11 | Ditto | 0.250 | 0.500 | X | 1.65 |
| EX. 12 | Ditto | 0.250 | 0.625 | X | — |
| EX. 13 | Ditto | 0.375 | 0.125 | ○ | 0.75 |
| EX. 14 | Ditto | 0.375 | 0.375 | ○ | 0.08 |
| EX. 15 | Ditto | 0.375 | 0.500 | ○ | 1.12 |
| EX. 16 | Ditto | 0.500 | 0.125 | ○ | 0.31 |
| EX. 17 | Ditto | 0.500 | 0.250 | ○ | 0.46 |
| EX. 18 | Ditto | 0.500 | 0.375 | ○ | 0.8 |
| EX. 19 | Ditto | 0.625 | 0.125 | ○ | 4.89 |
| EX. 20 | Ditto | 0.625 | 0.250 | ○ | — |
| EX. 21 | Ditto | 0.750 | 0.125 | ○ | — |
| COMP. EX. 1 | $BaZr_{0.8}In_{0.2}O_{3-\delta}$ | | | ○ | 12.3 |
| COMP. EX. 2 | $La_{0.6}Sr_{0.4}Co_{0.2}Fe_{0.8}O_{3-\delta}$ | | | ○ | 0.49 |

EXAMPLE 10, EXAMPLE 14, EXAMPLE 16 and EXAMPLE 17 are proton-electron mixed conductors. In the evaluation of the reaction resistance, the material used for the electrolyte membrane was a proton conductive material, specifically, $BaZr_{0.8}Yb_{0.2}O_{3-\delta}$ (wherein $0<\delta<0.5$). When this electrolyte membrane is used in combination with an electrode material having no proton conductivity as is the case in COMPARATIVE EXAMPLE 2, the region where the reaction proceeds is the interface at which electrons conducted through the electrode, protons conducted through the electrolyte membrane, and oxygen gas come into contact with one another (that is, the three-phase interface). For example, the oxygen gas that is used here may be oxygen gas derived from air or may be a synthetic gas obtained by mixing oxygen and other gas such as nitrogen in any ratio. When, on the other hand, the electrode material has proton Example 22

(Preparation of Electrode Material)

An electrode material was synthesized by a complex polymerization method. The synthesis started with preparing solutions. An electrode material was synthesized using the solutions prepared.

(1) Preparation of Solutions (a) Zr Solution

A Zr solution was prepared using the following material.

$ZrO(NO_3)_2.2H_2O$ (240 g, manufactured by KANTO CHEMICAL CO., INC.)

The above material was added to a polyethylene container containing 1800 mL of distilled water. Next, the distilled water containing the material was stirred sufficiently. A Zr solution was thus obtained. The concentration of Zr ions in the solution was calculated using inductively coupled plasma atomic emission spectroscopy (hereinafter, ICP-AES). The ICP-AES analyzer that was used was "iCAP7400 Duo" manufactured by Thermo Fisher Scientific K.K. As a result of the analysis, the concentration of Zr in the Zr solution was 0.46 mol/L.

(b) Yb Solution

A Yb solution was prepared using the following materials.

$Yb(NO_3)_3 \cdot 5H_2O$ (300 g, manufactured by Kojundo Chemical Laboratory Co., Ltd.)

$C_6H_8O_7 \cdot H_2O$ (300 g, manufactured by KANTO CHEMICAL CO., INC.)

The above materials were added to a polyethylene container containing 500 mL of distilled water. Next, the distilled water containing the materials was stirred sufficiently. A Yb solution was thus obtained. The concentration of Yb ions in the solution was calculated using ICP-AES in the same manner as the calculation of the concentration of Zr ions in the Zr solution described in (a) above. As a result, the concentration of Yb in the Yb solution was 0.87 mol/L. The concentration of citric acid (namely, $C_6H_8O_7$) in the solution was calculated to be 2.84 mol/L based on the ratio of the amount added of $C_6H_8O_7 \cdot H_2O$ to the amount added of distilled water.

(c) Co Solution

A Co solution was prepared using the following materials.

$Co(NO_3)_2 \cdot 6H_2O$ (300 g, manufactured by KANTO CHEMICAL CO., INC.)

$C_6H_8O_7 \cdot H_2O$ (300 g, manufactured by KANTO CHEMICAL CO., INC.)

The above materials were added to a polyethylene container containing 500 mL of distilled water. Next, the distilled water containing the materials was stirred sufficiently. A Co solution was thus obtained. The concentration of Co ions in the solution was calculated using ICP-AES in the same manner as the calculation of the concentration of Zr ions in the Zr solution described in (a) above. As a result, the concentration of Co in the Co solution was 1.20 mol/L. The concentration of citric acid (namely, $C_6H_8O_7$) in the solution was calculated to be 2.84 mol/L based on the ratio of the amount added of $C_6H_8O_7 \cdot H_2O$ to the amount added of distilled water.

(d) Citric Acid Solution

A citric acid solution was prepared using the following material.

$C_6H_8O_7 \cdot H_2O$ (1200 g, manufactured by KANTO CHEMICAL CO., INC.)

The above material was added to a polyethylene container containing 2000 mL of distilled water. Next, the distilled water containing the material was stirred sufficiently. A citric acid solution was thus obtained. The concentration of citric acid (namely, $C_6H_8O^7$) in the solution was calculated to be 2.84 mol/L based on the ratio of the amount added of $C_6H_8O_7 \cdot H_2O$ to the amount added of distilled water.

(2) Synthesis of Electrode Material

An electrode material of EXAMPLE 22 was synthesized using the solutions prepared as described above. The following materials and solutions were used for the synthesis of the electrode material of EXAMPLE 22.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (54.3 mL; amount of Zr=0.025 mol)

Yb solution (14.4 mL; amount of Yb=0.0125 mol, amount of citric acid=0.041 mol)

Co solution (10.4 mL; amount of Co=0.0125 mol, amount of citric acid=0.030 mol)

Citric acid solution (71.4 mL; amount of citric acid=0.203 mol)

Ethylene glycol (2 mol)

First, citric acid monohydrate (namely, $C_6H_8O_7 \cdot H_2O$) was added to a 1 L beaker. Next, 80 mL of distilled water was added to the 1 L beaker and the mixture was stirred with a stirrer. Thus, a colorless and transparent first aqueous solution was obtained. $BaCO_3$ was added to the colorless and transparent first aqueous solution obtained. The mixture was stirred with a stirrer to completely dissolve $BaCO_3$. Thus, a colorless and transparent second aqueous solution was obtained. While continuing stirring of the colorless and transparent second aqueous solution obtained, the Zr solution, the Yb solution, the Co solution and the citric acid solution were added in the amounts described above to the colorless and transparent second aqueous solution using a pipettor. Further, ethylene glycol was also added to the colorless and transparent second aqueous solution. A mixture solution was thus obtained.

The mixture solution obtained was continuously stirred with a stirrer. The mixture solution obtained was heated to about 90° C. using a mantle heater. Consequently, water was evaporated from the mixture solution. The mixture solution was further heated to about 130° C., and ethylene glycol was removed by evaporation to accelerate the polymerization and to concentrate the system. Heating was stopped when the amount of the solution decreased to 100 mL. A liquid concentrate was thus obtained. The liquid concentrate obtained was transferred to an alumina crucible and was allowed to cool. Next, heating was performed in a dryer at 120° C. for 6 hours. Consequently, ethylene glycol was removed from the liquid concentrate. Subsequently, the alumina crucible containing the liquid concentrate free from ethylene glycol was preheated in the air at 500° C. for 3 hours. As a result, organic components were removed. A solid was thus obtained. Subsequently, the solid obtained was crushed in a mortar to give a preheated powder. Subsequently, the preheated powder was added to an alumina crucible and was heat-treated in an air atmosphere at 1200° C. for 2 hours. The solid obtained was crushed in a mortar. An electrode material was thus obtained. Table 2 describes the values of x and y in the chemical formula $BaZr_{1-x-y}Yb_xCo_yO_{3-\delta}$ calculated from the starting materials.

(X-Ray Diffraction of Electrode Material)

The crystal structure of the electrode material obtained was analyzed with X-ray diffractometer "SmartLab" (manufactured by Rigaku Corporation). Specifically, CuKα radiation was used as the X-ray source, and the electrode material obtained was irradiated with the X-ray by a parallel beam method. The analysis confirmed that the synthesized oxide had the desired composition based on known peaks of $BaZrO_3$ (database: JCPDS 00-006-0399).

(Production of Membrane Electrode Assembly)

Next, a method for producing a membrane electrode assembly will be described.

First, an electrolyte membrane was prepared using $BaZr_{0.8}Yb_{0.2}O_{2.9}$. Approximately 10 g of the electrolyte material $BaZr_{0.8}Yb_{0.2}O_{2.9}$ was introduced into a powder compaction die (having a diameter of 20 mm). Next, the electrolyte material $BaZr_{0.8}Yb_{0.2}O_{2.9}$ was pressed into a cylindrical shape using a hydraulic pump to give a pellet. The pellet obtained was placed into a bag and packed. The bag containing the pellet was pressurized by a cold isostatic pressing (namely, "CIP") method at 200 MPa for 3 minutes. A compact was thus obtained. The compact obtained was heat-treated in an air atmosphere at 1750° C. for 24 hours to give a sintered product. The sintered product obtained was polished with a lapping film (manufactured by 3M Company) having a grain size of 15 microns. After being polished, the sintered product had a thickness of about 500 µm. An electrolyte membrane was thus produced. The electrolyte membrane had two main surfaces (namely, a first main surface and a second main surface). The electrolyte material $BaZr_{0.8}Yb_{0.2}O_{2.9}$ corresponds to the compound of the chemical formula $BaZr_{1-x1}M1_{x1}O_{3-\delta}$ in which M1 is Yb, x1=0.2 and δ=0.1.

Next, a first electrode was prepared. The electrode material produced as described above was pulverized with a planetary ball mill (manufactured by Fritsch) for use in the preparation of the first electrode. The electrode material was crushed with zirconia balls (2 mm (I)). Butyl acetate was used as a solvent. The planetary ball mill was operated at 350 rpm for 120 minutes. Subsequently, the powder of the electrode material was filtered out from the zirconia balls and the butyl acetate solvent, and was dried. Thus, a powder of the electrode material was obtained. The grain size distribution of the electrode material powder obtained was measured with a grain size distribution analyzer (product name: MT3300EX II, manufactured by Microtrac). The value of median diameter D50 of the electrode material powder was about 0.3 µm. The median diameter D50 means the particle size at 50% cumulative volume in the volume-based particle size distribution.

Subsequently, a paste containing the electrode material was prepared as follows in order to apply the electrode material powder into a film.

The following materials were provided as starting materials for the paste.

Electrode material powder 10 g

EC vehicle (manufactured by NISSIN-KASEI CO., LTD.) 6.7 g

The electrode material and the EC vehicle were added to a plastic container. The container was shaken using a planetary mixer at 1000 rpm for 5 minutes. A paste precursor was thus obtained. The paste precursor obtained was dispersed using a three-roll mill (trade name: BR-100VIII, manufactured by AIMEX CO., Ltd.). An electrode dispersion was thus obtained.

The electrode dispersion obtained was printed by a screen printing method onto the center of the first main surface of the electrolyte membrane produced as described hereinabove. The first electrode thus produced was circular and had a diameter of 15 mm. A membrane electrode assembly was thus produced.

(Fabrication of Evaluation Cell)

Next, a method will be described for the fabrication of an evaluation cell for evaluating the electrode activity.

First, an evaluation membrane electrode assembly was produced using the membrane electrode assembly produced by the method described hereinabove.

The electrode dispersion was printed also onto the second main surface of the electrolyte membrane constituting the membrane electrode assembly. Next, the membrane electrode assembly on which the electrode dispersion was printed was heat-treated in an air atmosphere at 1100° C. (hereinafter, referred to as the "electrode baking temperature") for 2 hours. An evaluation membrane electrode assembly was thus obtained.

Next, an evaluation cell was fabricated using the evaluation membrane electrode assembly obtained. A technique described below was adopted to evaluate the electrode activity of the evaluation membrane electrode assembly that was fabricated. The following were provided for the preparation of an evaluation cell.

Evaluation membrane electrode assembly

Silver ink (manufactured by TOYO Corporation)

The silver ink was printed by a screen printing method onto the electrodes on both sides of the evaluation membrane electrode assembly. An evaluation cell precursor was thus obtained. The silver ink that was printed had a diameter of 15 mm. The evaluation cell precursor obtained was heat-treated in an air atmosphere at 800° C. for 1 hour. An evaluation cell was thus fabricated.

(Measurement of Reaction Resistance Using Evaluation Cell)

The reaction resistance of the evaluation cell was measured.

Air that had been humidified so that the dew point temperature would be 20° C. was flowed (flow rate: 100 mL/min) through the evaluation cell, and the reaction resistance of the evaluation cell was measured based on an AC impedance method performed at a temperature of 600° C.

Specifically, using ModuLab XM ECS (manufactured by Solartron Analytical), AC signals with an amplitude of 10 mV were applied to the cell in the range of 1 MHz to 0.01 Hz. With respect to the arc drawn in the Nyquist plot in the range of frequencies of about 100 kHz to 0.01 Hz, a real number was obtained from the intersection of the arc and the real axis on the high frequency side to the end on the low frequency side. In a fuel cell, the reaction resistance acquired by the AC impedance method usually shows two separate semicircular waveforms for the positive electrode and the negative electrode. The evaluation cell used in this measurement, however, had the same materials on both sides. Therefore, the results obtained in this measurement are an overlap of the current responses of the air electrodes. Thus, the real number was halved to consider the electrode activity per side, and the halved real number was taken as the reaction resistance. Incidentally, the reaction resistance is an energy loss required for electron transfer in an electrochemical reaction at an electrode. The resistance that was calculated probably had correlation with the activity of the electrode. Thus, the electrode activity was evaluated as good or poor based on the magnitude of the resistance calculated.

The following is a reference to the specific procedures for evaluating the reaction resistance.

(i) When the arc drawn in the Nyquist plot in the range of frequencies of about 100 kHz to 0.01 Hz had an intersection of the arc and the real axis on the high frequency side (for example, $I_3$ illustrated in FIG. 17): A real number (for example, R4 illustrated in FIG. 17) was obtained from the intersection of the arc and the real axis on the high frequency side to the end on the low frequency side (for example, 14 illustrated in FIG. 17). The real number was taken as the reaction resistance.

(ii) When the arc drawn in the Nyquist plot in the range of frequencies of about 100 kHz to 0.01 Hz had no intersection of the arc and the real axis on the high frequency side: A real number was obtained from the minimum point of the arc to the end on the low frequency side. The real number was taken as the reaction resistance.

Example 23

In EXAMPLE 23, electrode materials, membrane electrode assemblies and evaluation cells were produced, the crystal structures of the electrode materials were analyzed, and the reaction resistance of the evaluation cells was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (14.4 mL; amount of Yb=0.0125 mol, amount of citric acid=0.041 mol)

Co solution (26.0 mL; amount of Co=0.0313 mol, amount of citric acid=0.074 mol)

Citric acid solution (55.8 mL; amount of citric acid=0.158 mol)

Ethylene glycol (2 mol)

(2) The heat treatment of the electrode material was performed under two temperature conditions of 1100° C. and 1200° C.

Example 24

In EXAMPLE 24, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (81.5 mL; amount of Zr=0.0375 mol)

Yb solution (7.2 mL; amount of Yb=0.0063 mol, amount of citric acid=0.02 mol)

Co solution (5.2 mL; amount of Co=0.0063 mol, amount of citric acid=0.015 mol)

Citric acid solution (83.8 mL; amount of citric acid=0.238 mol)

Ethylene glycol (2 mol)

Example 25

In EXAMPLE 25, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (67.9 mL; amount of Zr=0.0313 mol)

Yb solution (7.2 mL; amount of Yb=0.0063 mol, amount of citric acid=0.02 mol)

Co solution (10.4 mL; amount of Co=0.0125 mol, amount of citric acid=0.030 mol)

Citric acid solution (78.6 mL; amount of citric acid=0.223 mol)

Ethylene glycol (2 mol)

Example 26

In EXAMPLE 26, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (54.4 mL; amount of Zr=0.025 mol)

Yb solution (7.2 mL; amount of Yb=0.0063 mol, amount of citric acid=0.02 mol)

Co solution (15.6 mL; amount of Co=0.0188 mol, amount of citric acid=0.044 mol)

Citric acid solution (73.4 mL; amount of citric acid=0.208 mol)

Ethylene glycol (2 mol)

(2) The heat treatment of the electrode material was performed at 1100° C.

Example 27

In EXAMPLE 27, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (40.8 mL; amount of Zr=0.0188 mol)

Yb solution (7.2 mL; amount of Yb=0.0063 mol, amount of citric acid=0.02 mol)

Co solution (20.8 mL; amount of Co=0.025 mol, amount of citric acid=0.059 mol)

Citric acid solution (68.1 mL; amount of citric acid=0.194 mol)

Ethylene glycol (2 mol)

(2) The heat treatment of the electrode material was performed at 1100° C.

Example 28

In EXAMPLE 28, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (27.2 mL; amount of Zr=0.0125 mol)

Yb solution (7.2 mL; amount of Yb=0.0063 mol, amount of citric acid=0.02 mol)

Co solution (26.0 mL; amount of Co=0.0313 mol, amount of citric acid=0.074 mol)

Citric acid solution (62.9 mL; amount of citric acid=0.179 mol)

Ethylene glycol (2 mol)

(2) The heat treatment of the electrode material was performed at 1100° C.

Example 29

In EXAMPLE 29, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (7.2 mL; amount of Yb=0.0063 mol, amount of citric acid=0.02 mol)

Co solution (31.3 mL; amount of Co=0.0375 mol, amount of citric acid=0.089 mol)

Citric acid solution (57.7 mL; amount of citric acid=0.164 mol)

Ethylene glycol (2 mol)

Example 30

In EXAMPLE 30, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (67.9 mL; amount of Zr=0.0313 mol)

Yb solution (14.4 mL; amount of Yb=0.0125 mol, amount of citric acid=0.041 mol)

Co solution (5.2 mL; amount of Co=0.0063 mol, amount of citric acid=0.015 mol)

Citric acid solution (76.6 mL; amount of citric acid=0.218 mol)

Ethylene glycol (2 mol)

Example 31

In EXAMPLE 31, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (40.8 mL; amount of Zr=0.0188 mol)

Yb solution (14.4 mL; amount of Yb=0.0125 mol, amount of citric acid=0.041 mol)

Co solution (15.6 mL; amount of Co=0.0188 mol, amount of citric acid=0.044 mol)

Citric acid solution (66.2 mL; amount of citric acid=0.188 mol)

Ethylene glycol (2 mol)

(2) The heat treatment of the electrode material was performed at 1100° C.

Example 32

In EXAMPLE 32, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (27.2 mL; amount of Zr=0.0125 mol)

Yb solution (14.4 mL; amount of Yb=0.0125 mol, amount of citric acid=0.041 mol)

Co solution (20.8 mL; amount of Co=0.025 mol, amount of citric acid=0.059 mol)

Citric acid solution (61.0 mL; amount of citric acid=0.173 mol)

Ethylene glycol (2 mol)

(2) The heat treatment of the electrode material was performed at 1100° C.

Example 33

In EXAMPLE 33, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (14.4 mL; amount of Yb=0.0125 mol, amount of citric acid=0.041 mol)

Co solution (26.0 mL; amount of Co=0.0313 mol, amount of citric acid=0.074 mol)

Citric acid solution (55.8 mL; amount of citric acid=0.158 mol)

Ethylene glycol (2 mol)

Example 34

In EXAMPLE 34, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (54.4 mL; amount of Zr=0.025 mol)

Yb solution (21.6 mL; amount of Yb=0.0188 mol, amount of citric acid=0.061 mol)

Co solution (5.2 mL; amount of Co=0.0063 mol, amount of citric acid=0.015 mol)

Citric acid solution (69.4 mL; amount of citric acid=0.197 mol)

Ethylene glycol (2 mol)

Example 35

In EXAMPLE 35, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (40.8 mL; amount of Zr=0.0188 mol)

Yb solution (21.6 mL; amount of Yb=0.0188 mol, amount of citric acid=0.061 mol)

Co solution (10.4 mL; amount of Co=0.0125 mol, amount of citric acid=0.030 mol)

Citric acid solution (64.2 mL; amount of citric acid=0.182 mol)

Ethylene glycol (2 mol)

Example 36

In EXAMPLE 36, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (27.2 mL; amount of Zr=0.0125 mol)

Yb solution (21.6 mL; amount of Yb=0.0188 mol, amount of citric acid=0.061 mol)

Co solution (15.6 mL; amount of Co=0.0188 mol, amount of citric acid=0.044 mol)

Citric acid solution (59.0 mL; amount of citric acid=0.168 mol)

Ethylene glycol (2 mol)

Example 37

In EXAMPLE 37, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (21.6 mL; amount of Yb=0.0188 mol, amount of citric acid=0.061 mol)

Co solution (20.8 mL; amount of Co=0.025 mol, amount of citric acid=0.059 mol)

Citric acid solution (53.8 mL; amount of citric acid=0.153 mol)

Ethylene glycol (2 mol)

Example 38

In EXAMPLE 38, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (40.8 mL; amount of Zr=0.0188 mol)

Yb solution (28.7 mL; amount of Yb=0.025 mol, amount of citric acid=0.082 mol)

Co solution (5.2 mL; amount of Co=0.0063 mol, amount of citric acid=0.015 mol)

Citric acid solution (62.2 mL; amount of citric acid=0.177 mol)

Ethylene glycol (2 mol)

Example 39

In EXAMPLE 39, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (27.2 mL; amount of Zr=0.0125 mol)

Yb solution (28.7 mL; amount of Yb=0.025 mol, amount of citric acid=0.082 mol)

Co solution (10.4 mL; amount of Co=0.0125 mol, amount of citric acid=0.030 mol)

Citric acid solution (57.0 mL; amount of citric acid=0.162 mol)

Ethylene glycol (2 mol)

Example 40

In EXAMPLE 40, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (28.7 mL; amount of Yb=0.025 mol, amount of citric acid=0.082 mol)

Co solution (15.6 mL; amount of Co=0.0188 mol, amount of citric acid=0.044 mol)

Citric acid solution (51.8 mL; amount of citric acid=0.147 mol)

Ethylene glycol (2 mol)

Example 41

In EXAMPLE 41, an electrode material, a membrane electrode assembly and an evaluation cell were produced, the crystal structure of the electrode material was analyzed, and the reaction resistance of the evaluation cell was measured in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (35.9 mL; amount of Yb=0.0313 mol, amount of citric acid=0.102 mol)

Co solution (10.4 mL; amount of Co=0.0125 mol, amount of citric acid=0.030 mol)

Citric acid solution (49.8 mL; amount of citric acid=0.142 mol)

Ethylene glycol (2 mol)

Example 42

In EXAMPLE 42, an electrode material, a membrane electrode assembly and an evaluation cell were produced, and the crystal structure of the electrode material was analyzed in the same manner as in EXAMPLE 22 except for the following item (1).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (13.6 mL; amount of Zr=0.0063 mol)

Yb solution (43.1 mL; amount of Yb=0.0375 mol, amount of citric acid=0.122 mol)

Co solution (5.2 mL; amount of Co=0.0063 mol, amount of citric acid=0.015 mol)

Citric acid solution (47.9 mL; amount of citric acid=0.136 mol)

Ethylene glycol (2 mol)

Example 43

In EXAMPLE 43, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (87.0 mL; amount of Zr=0.040 mol)

Yb solution (4.3 mL; amount of Yb=0.0038 mol, amount of citric acid=0.012 mol)

Co solution (5.2 mL; amount of Co=0.0063 mol, amount of citric acid=0.015 mol)

Citric acid solution (86.6 mL; amount of citric acid=0.246 mol)

Ethylene glycol (2 mol)

(2) The heat treatment of the electrode material was performed at 1100° C.

Example 44

In EXAMPLE 44, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (73.4 mL; amount of Zr=0.0338 mol)

Yb solution (4.3 mL; amount of Yb=0.0038 mol, amount of citric acid=0.012 mol)

Co solution (10.4 mL; amount of Co=0.0125 mol, amount of citric acid=0.030 mol)

Citric acid solution (81.4 mL; amount of citric acid=0.231 mol)

Ethylene glycol (2 mol)

(2) The heat treatment of the electrode material was performed at 1100° C.

Example 45

In EXAMPLE 45, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (59.8 mL; amount of Zr=0.0275 mol)

Yb solution (4.3 mL; amount of Yb=0.0038 mol, amount of citric acid=0.012 mol)

Co solution (15.6 mL; amount of Co=0.0188 mol, amount of citric acid=0.044 mol)

Citric acid solution (76.2 mL; amount of citric acid=0.217 mol)

Ethylene glycol (2 mol)

(2) The heat treatment of the electrode material was performed at 1100° C.

Example 46

In EXAMPLE 46, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (46.2 mL; amount of Zr=0.0213 mol)

Yb solution (4.3 mL; amount of Yb=0.0038 mol, amount of citric acid=0.012 mol)

Co solution (20.8 mL; amount of Co=0.025 mol, amount of citric acid=0.059 mol)

Citric acid solution (71.0 mL; amount of citric acid=0.202 mol)

Ethylene glycol (2 mol)

(2) The heat treatment of the electrode material was performed at 1100° C.

Example 47

In EXAMPLE 47, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (32.6 mL; amount of Zr=0.015 mol)

Yb solution (4.3 mL; amount of Yb=0.0038 mol, amount of citric acid=0.012 mol)

Co solution (26.0 mL; amount of Co=0.0313 mol, amount of citric acid=0.074 mol)

Citric acid solution (65.81 mL; amount of citric acid=0.187 mol)

Ethylene glycol (2 mol)

(2) The heat treatment of the electrode material was performed at 1100° C.

Example 48

In EXAMPLE 48, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials and solutions.

$BaCO_3$ (0.05 mol, manufactured by KANTO CHEMICAL CO., INC.)

$C_6H_8O_7 \cdot H_2O$ (0.227 mol, manufactured by KANTO CHEMICAL CO., INC.)

Zr solution (19.0 mL; amount of Zr=0.0088 mol)

Yb solution (4.3 mL; amount of Yb=0.0038 mol, amount of citric acid=0.012 mol)

Co solution (31.3 mL; amount of Co=0.0375 mol, amount of citric acid=0.089 mol)

Citric acid solution (60.6 mL; amount of citric acid=0.172 mol)

Ethylene glycol (2 mol)

(2) The heat treatment of the electrode material was performed at 1100° C.

Comparative Example 3

In COMPARATIVE EXAMPLE 3, an electrode material, a membrane electrode assembly and an evaluation cell were produced, the crystal structure of the electrode material was analyzed, and the reaction resistance of the evaluation cell was measured in the same manner as in EXAMPLE 22 except for the following items (1) and (2).

(1) The starting materials for the electrode material were changed to the following materials.

$BaCO_3$ (0.200 mol, manufactured by KANTO CHEMICAL CO., INC.)

$ZrO_2$ (0.160 mol, manufactured by KANTO CHEMICAL CO., INC.)

$Yb_2O_3$ (0.020 mol, manufactured by Kojundo Chemical Laboratory Co., Ltd.)

(2) The procedure for synthesizing the electrode material was changed as follows.

The above starting materials and 50 mL of distilled water were added to a 250 mL container. Next, the container was shaken using a planetary ball mill (manufactured by Fritsch) at 200 rpm for 10 minutes. This shaking operation was repeated twice. A mixture liquid was thus obtained. The mixture liquid obtained was dried in a dryer (MOV-212F, manufactured by Panasonic Corporation) at 120° C. for 6 hours to remove water from the mixture liquid. A solid was thus obtained. The solid obtained was crushed in a mortar, and the resultant powder was transferred to an alumina crucible (manufactured by NIKKATO CORPORATION). The alumina crucible was then heat-treated in an air atmosphere at a temperature of 1400° C. for 2 hours. An electrode material was thus obtained. Table 2 describes the value of x and the value of y in the chemical formula $BaZr_{1-x-y}Yb_xCo_yO_{3-\delta}$ calculated from the starting materials.

(Experimental Results and Discussion)

(X-Ray Diffraction Profiles and Identification of Synthesized Compounds)

X-ray diffraction profiles of the electrode materials of EXAMPLES 22 to 48, and COMPARATIVE EXAMPLES 1 to 3, and the compounds synthesized will be discussed with reference to FIG. 11 to FIG. 15 and Table 2.

Figure 11:
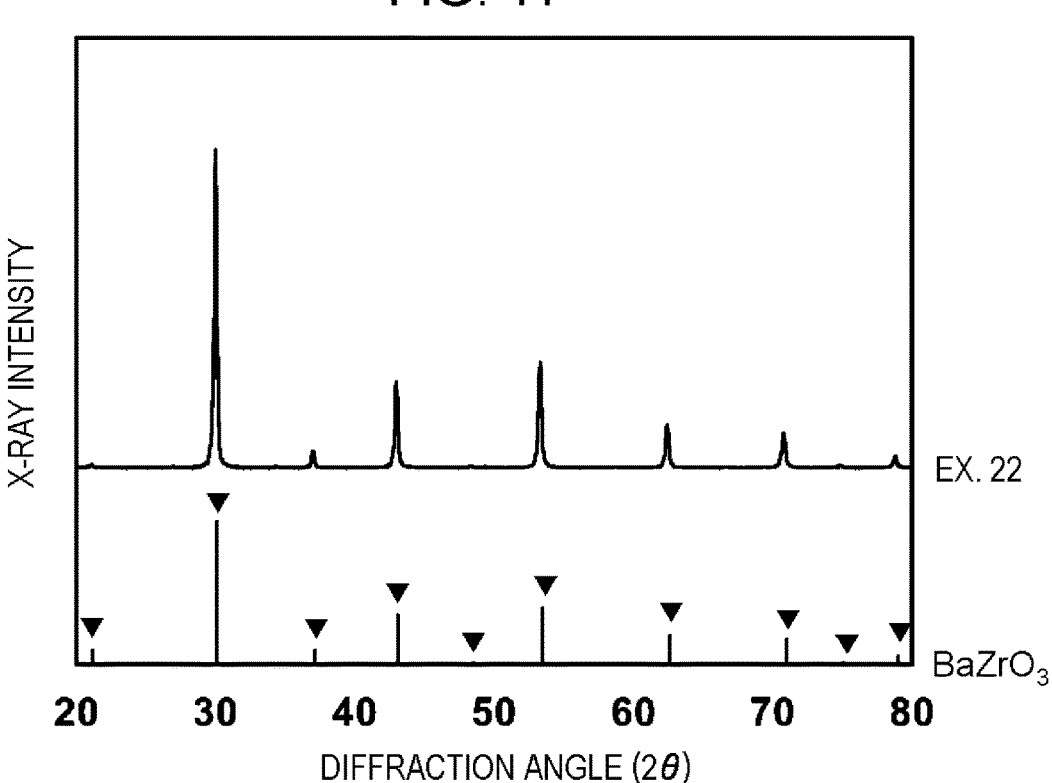
FIG. 11 is a graph illustrating an X-ray diffraction profile of an electrode material of EXAMPLE 22.
Figure 12:
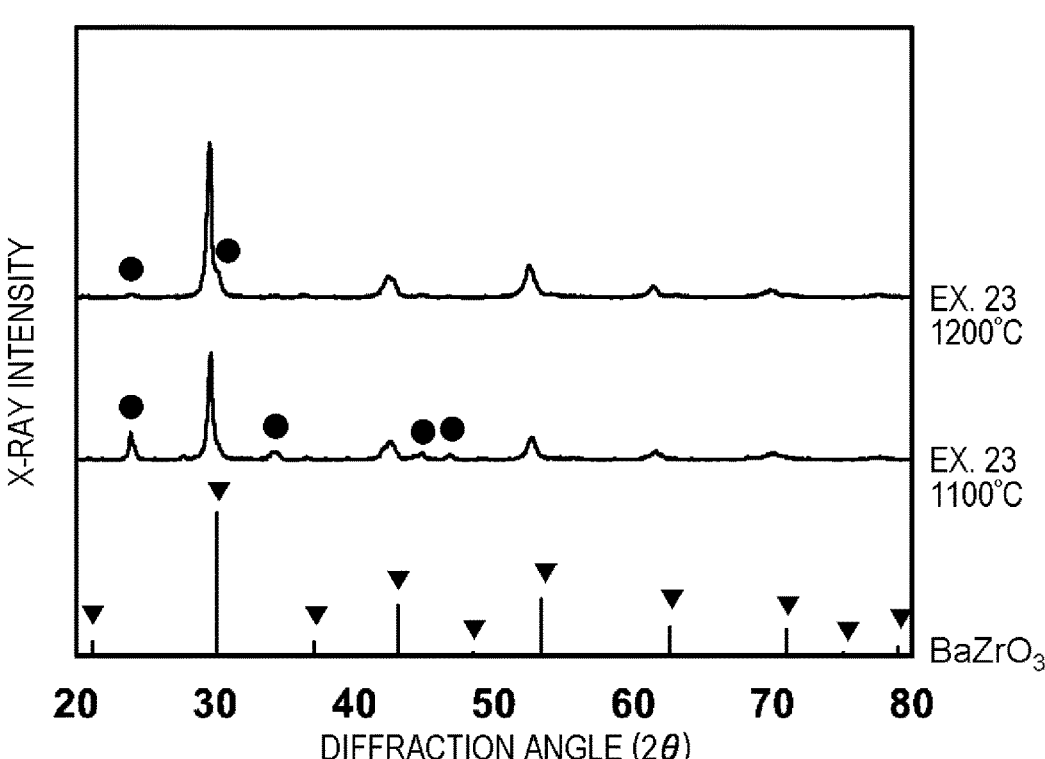
FIG. 12 is a graph illustrating X-ray diffraction profiles of electrode materials of EXAMPLE 23.

FIG. 11 is a graph illustrating an X-ray diffraction profile of the electrode material of EXAMPLE 22. FIG. 12 is a graph illustrating X-ray diffraction profiles of the electrode materials of EXAMPLE 23. In FIG. 11 and FIG. 12, the abscissa and the ordinate indicate the diffraction angle (namely, 2θ) and the X-ray intensity, respectively.

As illustrated in FIG. 11, the peaks of the electrode material of EXAMPLE 22 substantially agreed with the peaks assigned to $BaZrO_3$ having a perovskite structure (database: JCPDS 00-006-0399, see the black down-pointing triangles in FIG. 11). The peaks showed a slight shift to the higher angle side probably because of the solid dissolution of Co and Yb in the starting materials into the crystals of $BaZrO_3$. It was thus revealed that the electrode material of EXAMPLE 22 was composed of a compound with a perovskite-type structure represented by $BaZr_{0.500}Yb_{0.250}Co_{0.250}O_{3-\delta}$, namely, was composed of a single compound. In other words, it was revealed that the electrode material was composed of a compound free from starting material-derived impurities.

On the other hand, as illustrated in FIG. 12, the peaks of the electrode materials of EXAMPLE 23 included peaks that did not correspond to the peaks assigned to $BaZrO_3$. For example, the electrode materials of EXAMPLE 23 had a peak at $2\theta$=about 24° that was not seen in $BaZrO_3$. The black dots in FIG. 12 are examples of the peaks not corresponding to $BaZrO_3$. These peaks are probably derived from the starting materials. Based on the presence of peaks not corresponding to $BaZrO_3$, the products synthesized in EXAMPLE 23 were identified as mixtures including $BaZr_{1-x-y}Yb_xCo_yO_{3-\delta}$ ($0<x<1$, $0<y<1$, $0<(x+y)<1$, and $0<\delta<1$), and compounds derived from the starting materials.

Figure 13:
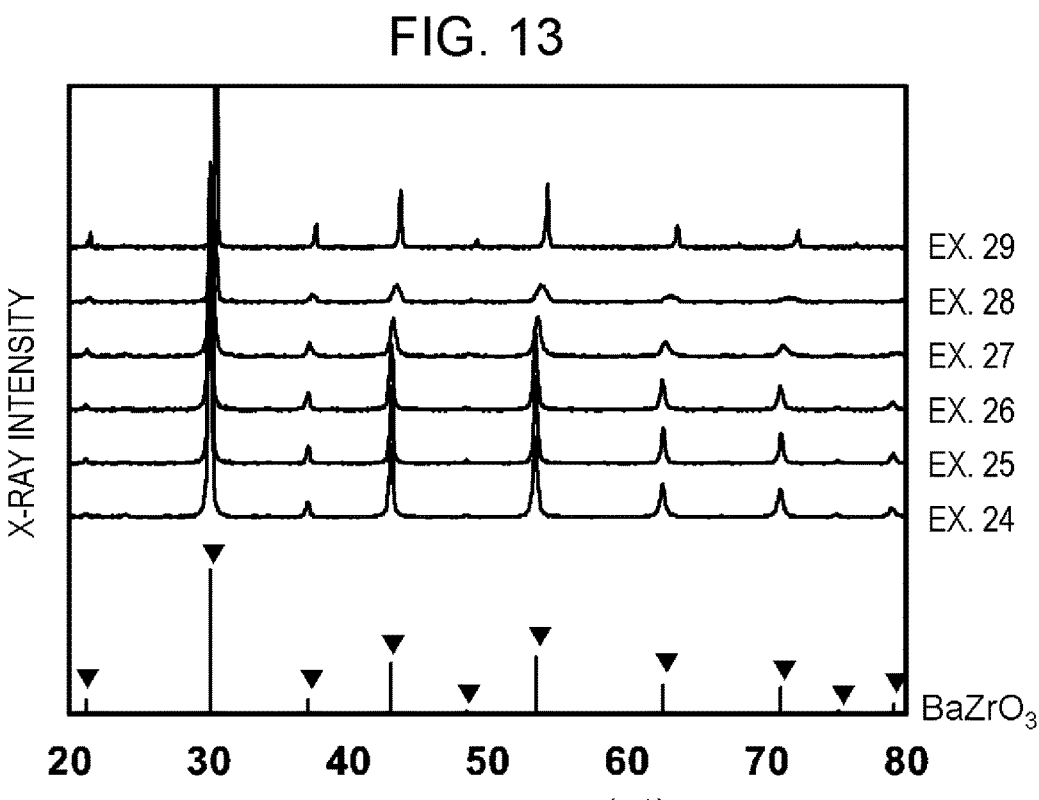
FIG. 13 is a graph illustrating X-ray diffraction profiles of electrode materials of EXAMPLES 24 to 29.
Figure 14:
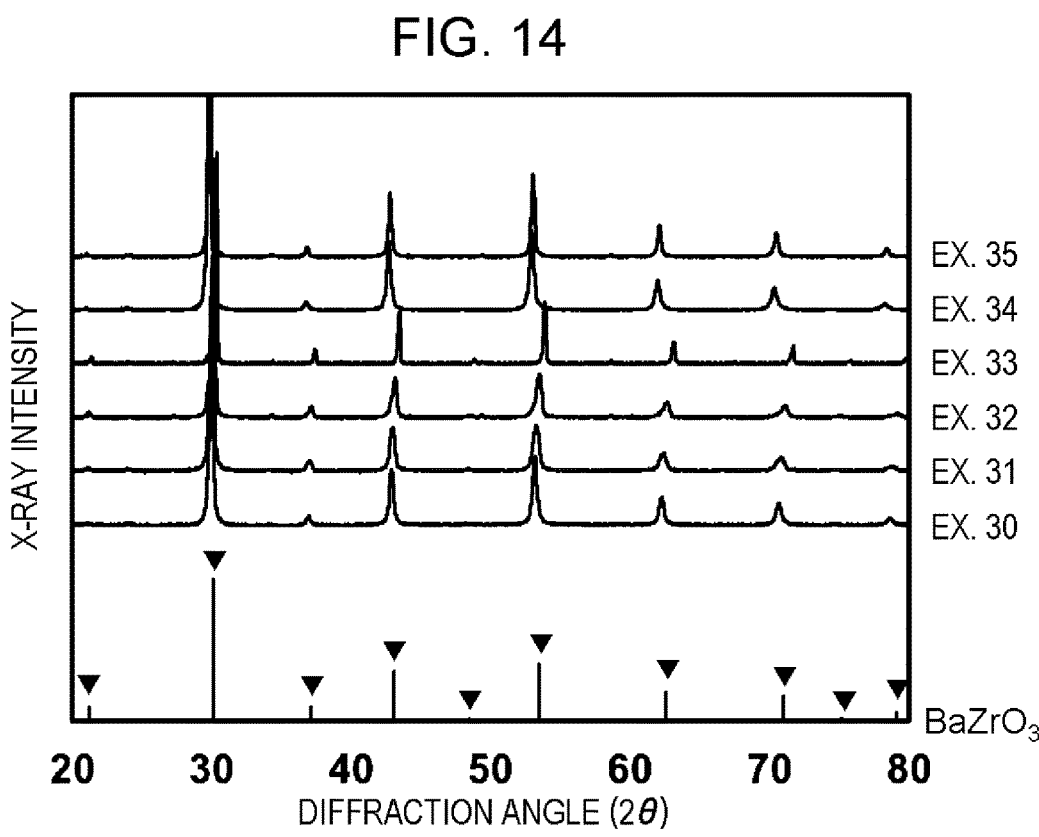
FIG. 14 is a graph illustrating X-ray diffraction profiles of electrode materials of EXAMPLES 30 to 35.
Figure 15:
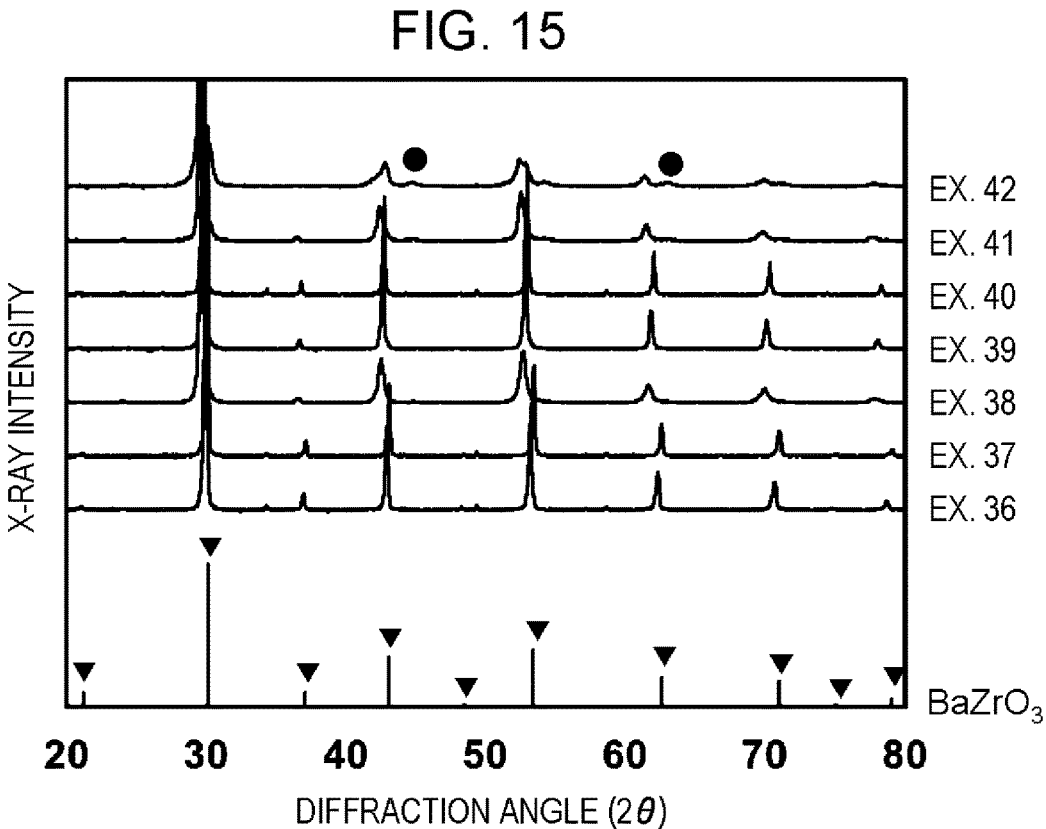
FIG. 15 is a graph illustrating X-ray diffraction profiles of electrode materials of EXAMPLES 36 to 42.
Figure 16:
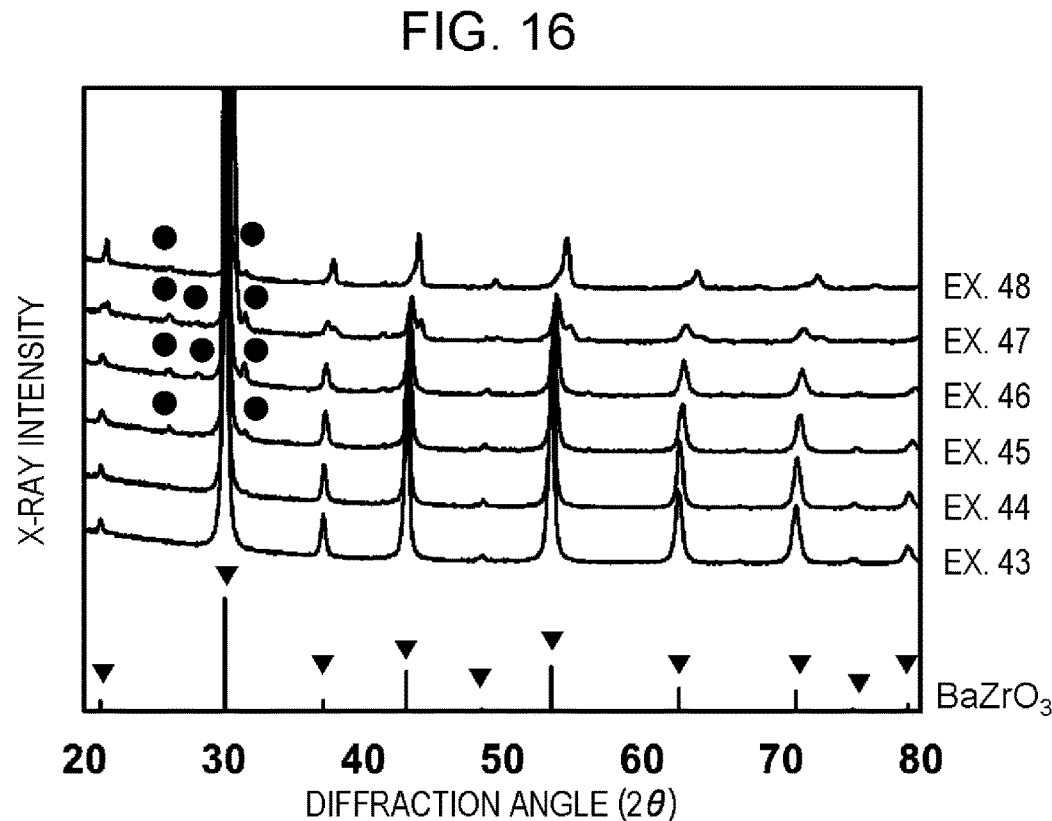
FIG. 16 is a graph illustrating X-ray diffraction profiles of electrode materials of EXAMPLES 43 to 48.

FIG. 13 is a graph illustrating X-ray diffraction profiles of the electrode materials of EXAMPLES 24 to 29. FIG. 14 is a graph illustrating X-ray diffraction profiles of the electrode materials of EXAMPLES 30 to 35. FIG. 15 is a graph illustrating X-ray diffraction profiles of the electrode materials of EXAMPLES 36 to 42. FIG. 16 is a graph illustrating X-ray diffraction profiles of the electrode materials of EXAMPLES 43 to 48. In FIG. 13 to FIG. 16, the abscissa and the ordinate indicate the diffraction angle (namely, $2\theta$) and the X-ray intensity, respectively.

The X-ray diffraction profiles of the electrode materials of EXAMPLES 24 to 48 were analyzed by the same method as described hereinabove. The synthesized compounds present in the electrode materials of EXAMPLES 24 to 48 were identified. The black dots illustrated in FIG. 15 and FIG. 16 are examples of peaks not corresponding to $BaZrO_3$.

Table 2 describes whether the electrode materials of EXAMPLES and COMPARATIVE EXAMPLES are composed of a single compound or are mixtures containing a plurality of compounds. In Table 2, the white dots (namely, ○) indicate that the electrode material was determined to be composed of a single compound. In Table 2, the x symbols indicate that the electrode material was determined not to be composed of a single compound (that is, to be composed of a mixture). Table 2 also describes COMPARATIVE EXAMPLES 1 and 2.

An electrode material may be a mixture of a plurality of compounds. An electrode including such an electrode material can function as an electrode. However, an electrode that is composed of an electrode material containing a plurality of compounds has less reaction regions than an electrode that includes an electrode material composed of a single compound.

Thus, an electrode material including a single compound is desirable, as is the case for the electrode material illustrated in EXAMPLE 22.

(Evaluation of Reaction Resistance of Cells of Example 22, Comparative Example 3 and Comparative Example 1)

The results of the evaluation of the reaction resistance of the cells of EXAMPLE 22, COMPARATIVE EXAMPLE 3 and COMPARATIVE EXAMPLE 1 will be discussed with reference to FIG. 17, FIG. 18 and FIG. 9.

Figure 17:
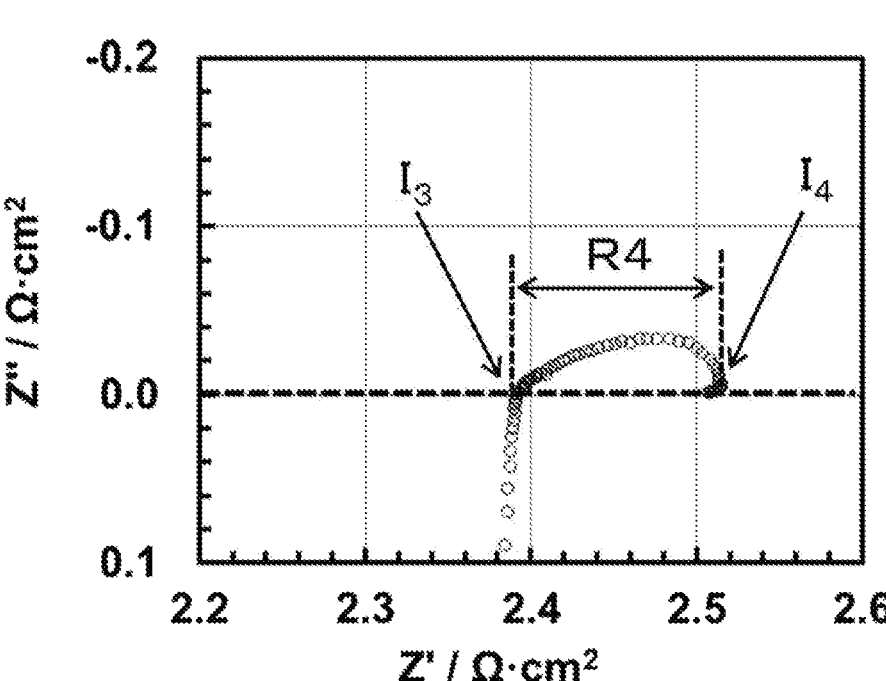
FIG. 17 illustrates a Nyquist plot of an evaluation cell using the electrode material of EXAMPLE 22.

FIG. 17 illustrates a Nyquist plot of the evaluation cell using the electrode material of EXAMPLE 22. FIG. 18 illustrates a Nyquist plot of the evaluation cell using the electrode material of COMPARATIVE EXAMPLE 3. As described hereinabove, FIG. 9 illustrates a Nyquist plot of the evaluation cell using the electrode material of COMPARATIVE EXAMPLE 1. Specifically, FIG. 17, FIG. 18 and FIG. 9 illustrate Nyquist plot data obtained by testing the cells of EXAMPLE 22, COMPARATIVE EXAMPLE 3 and COMPARATIVE EXAMPLE 1 by an AC impedance method, respectively.

As illustrated in FIG. 17, a real number (see R4 in FIG. 17) was calculated from the intersection (see 13 in FIG. 17) of the real axis (see the broken line in FIG. 17, that is, y=0) and the high frequency side of the arc drawn with the change in frequency, to the end on the low frequency side (see $I_4$ in FIG. 17). The value obtained by halving the real number R4 is the reaction resistance (unit: $\Omega cm^2$).

Figure 18:
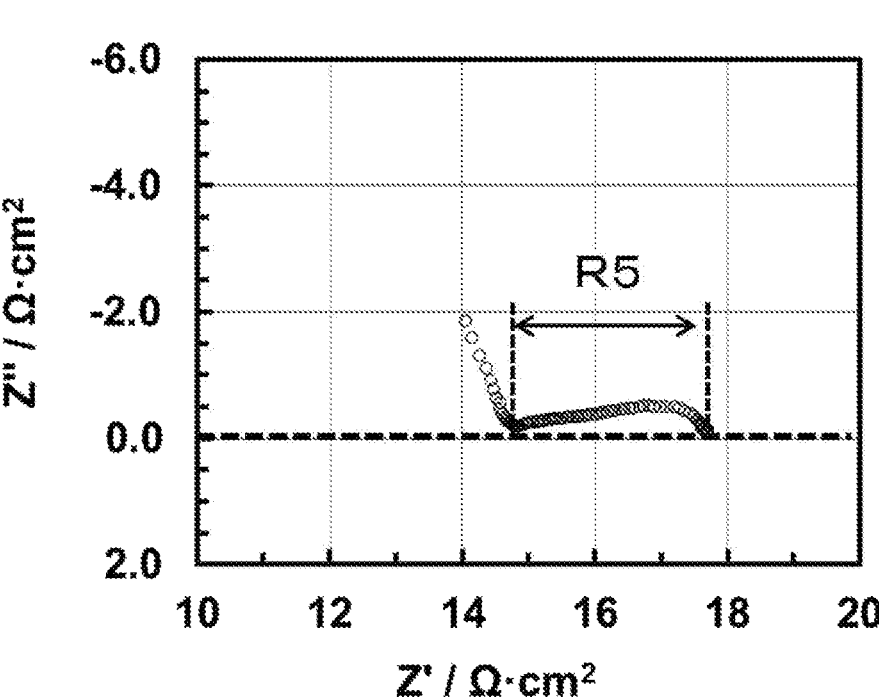
FIG. 18 illustrates a Nyquist plot of an evaluation cell using an electrode material of COMPARATIVE EXAMPLE 3.

As illustrated in FIG. 18 and FIG. 9, the Nyquist plots for COMPARATIVE EXAMPLE 3 and COMPARATIVE EXAMPLE 1 do not have an intersection between the real axis and the arc drawn with the change in frequency. In this case, as illustrated in FIG. 18 and FIG. 9, a real number (see R5 in FIGS. 18 and R2 in FIG. 9) was calculated from the minimum point to the end on the low frequency side. The values obtained by halving the real numbers R5 and R2 were each taken as the reaction resistance.

From the reading of FIG. 17, FIG. 18 and FIG. 9, the reaction resistance of the cell of EXAMPLE 22 is clearly lower than those of the cells of COMPARATIVE EXAMPLE 3 and COMPARATIVE EXAMPLE 1. That is, the electrode in the cell of EXAMPLE 22 has an excellent performance. The reason behind this is probably because Co contained in the electrode material of EXAMPLE 22 functioned as an electrode active site. In contrast, the electrode materials of COMPARATIVE EXAMPLE 3 and COMPARATIVE EXAMPLE 1 have a low function as an electrode.

As discussed above, the addition of Co to a compound represented by the chemical formula $BaZr_{1-x}M_xO_{3-\delta}$ (wherein the element M is a trivalent substitution element, $0<x<1$, and $0<\delta<0.5$) that is a conventional proton conductive electrolyte material will result in an electrode material offering advantageous effects.

(Evaluation of Reaction Resistance of Cells of Example 22 and Comparative Example 2)

The results of the evaluation of the reaction resistance of the cells of EXAMPLE 22 and COMPARATIVE EXAMPLE 2 will be discussed with reference to FIG. 17, FIG. 10 and Table 2.

As described hereinabove, FIG. 10 illustrates a Nyquist plot of the evaluation cell using the electrode material of COMPARATIVE EXAMPLE 2. Specifically, FIG. 10 illustrates Nyquist plot data obtained by testing the cell of COMPARATIVE EXAMPLE 2 by an AC impedance method. The electrode material of COMPARATIVE EXAMPLE 2 is an oxide ion-electron mixed conductor known to have excellent electrode activity. The electrode material of COMPARATIVE EXAMPLE 2 is a material frequently used in an SOFC air electrode.

The Nyquist plot of the cell of COMPARATIVE EXAMPLE 2 showed a similar tendency as the Nyquist plot of the cell of EXAMPLE 22. Specifically, the values of resistance showed a tendency to draw a semicircle as the frequency of the applied AC signals was changed from high frequency to low frequency.

The reaction resistance of the cell of EXAMPLE 22 was 0.06 $\Omega cm^2$. On the other hand, the reaction resistance of the cell of COMPARATIVE EXAMPLE 2 was 0.49 $\Omega cm^2$. The reaction resistance of the cell of EXAMPLE 22 was lower than the reaction resistance of the cell of COMPARATIVE EXAMPLE 2. Thus, the use of the cell of EXAMPLE 22 is expected to offer high electrode activity in various electrochemical devices. The electrode material of EXAMPLE 22 is expected to offer a high output when used in a fuel cell.

(Summary and Discussion)

The evaluation results of the cells of EXAMPLES 22 to 48, and COMPARATIVE EXAMPLES 1 to 3 will be discussed with reference to Table 2.

As described in Table 2, the electrode materials that included a compound represented by the chemical formula $BaZr_{1-x-y}Yb_xCo_yO_{3-\delta}$ (wherein $0<x<1$, $0<y<1$, $(x+y)<1$, and $0<\delta<1$) were synthesized as an electrode material composed of the above compound as a single compound or were synthesized as an electrode material composed of a mixture of the above compound and other compounds, depending on the values of x and Y.

For example, the electrode material that includes a compound represented by the chemical formula $BaZr_{1-x-y}Yb_x$-$Co_yO_{3-\delta}$ ($0<x<1$, $0<y<1$, $(x+y)<1$, and $0<\delta<1$) corresponds to a material resulting from the addition of Co to $BaZr_{1-x}M_xO_{3-\delta}$ disclosed as a proton conductive material in Patent Literature 1. The electrode material including a Co-containing compound represented by the chemical formula $BaZr_{1-x-y}Yb_xCo_yO_{3-\delta}$ ($0<x<1$, $0<y<1$, $(x+y)<1$, and $0<\delta<1$) successfully realized a lower reaction resistance than $BaZr_{1-x}M_xO_{3-\rho}$. Specifically, the electrode materials of EXAMPLES 22 to 48 had a low reaction resistance as compared with $BaZr_{0.8}Yb_{0.2}O_{3-\delta}$ of COMPARATIVE EXAMPLE 3.

Depending on the composition, the electrode materials that included a compound represented by the chemical formula $BaZr_{1-x-y}Yb_xCo_yO_{3-\delta}$ ($0<x<1$, $0<y<1$, $(x+y)<1$, and $0<\delta<1$) had a reaction resistance lower than the reaction resistance of the electrode material of COMPARATIVE EXAMPLE 2. Specifically, it has been found that the electrode material of the present disclosure may achieve a lower reaction resistance than the conventional electrode material having excellent electrode activity as an oxide ion-electron mixed conductor. More specifically, the values of reaction resistance of the electrodes of EXAMPLE 22, EXAMPLES 25 to 41, and EXAMPLES 44 to 48 were lower than the reaction resistance of the electrode of COMPARATIVE EXAMPLE 2. The reason behind this result is probably because the electrode materials of EXAMPLE 22, EXAMPLES 25 to 41, and EXAMPLES 44 to 48 are proton-electron mixed conductors. In the evaluation of the reaction resistance, the material used for the electrolyte membrane was a proton conductive material, specifically, $BaZr_{0.8}Yb_{0.2}O_{2.9}$. When this electrolyte membrane is used in combination with an electrode material having no proton conductivity as is the case in COMPARATIVE EXAMPLE 3, the region where the reaction proceeds is the interface at which electrons conducted through the electrode, protons conducted through the electrolyte membrane, and oxygen gas come into contact with one another (that is, the three-phase interface). For example, the oxygen gas that is used here may be oxygen gas derived from air or may be a synthetic gas obtained by mixing oxygen and other gas such as nitrogen in any ratio. When, on the other hand, the electrode material has proton conductivity, the reaction also proceeds at the surface of the electrode particles (that is, also at the two-phase interface). Provided that the cell sizes are the same, the area of the three-phase interface is generally smaller than the area of the two-phase interface. Thus, as is the case in EXAMPLE 22, the electrode material of the present disclosure used in a cell including a proton conductive electrolyte membrane allows the cell to exhibit a superior electrode performance. The use of cells including the electrode materials of EXAMPLE 22, EXAMPLES 25 to 41, and EXAMPLES 44 to 48 is expected to offer high electrode activity in various electrochemical devices. The electrode materials of EXAMPLE 22, EXAMPLES 25 to 41, and EXAMPLES 44 to 48 are expected to offer a high output when used in a fuel cell.

In the embodiments and EXAMPLES described hereinabove, the values of x and y indicate the amounts added and may differ from the measured values by a margin of error of greater than or equal to −0.02 and less than or equal to +0.02. That is, the ranges of the values of x and y described hereinabove may have a margin of error of greater than or equal to −0.02 and less than or equal to +0.02. The measured values may be obtained by, for example, analyzing a measurement sample by ICP emission spectroscopy. The measurement sample that is used may be, for example, one obtained by weighing a sample for the value of x or y, adding hydrochloric acid and nitric acid, microwaving the mixture until the sample is dissolved, and diluting the solution with ion-exchanged water to a predetermined volume.

TABLE 2

| | Compound | | | Single | Reaction resistance |
| | Composition | Value of x | Value of y | compound | [$\Omega cm^2$] |
|---|---|---|---|---|---|
| EX. 22 | $BaZr_{(1-x-y)}Yb_xCo_yO_{3-\delta}$ | 0.250 | 0.250 | ○ | 0.06 |
| EX. 23 | Ditto | 0.625 | 0.125 | X | 1.20 |
| EX. 24 | Ditto | 0.125 | 0.125 | ○ | 0.86 |
| EX. 25 | Ditto | 0.125 | 0.250 | ○ | 0.14 |
| EX. 26 | Ditto | 0.125 | 0.375 | ○ | 0.12 |
| EX. 27 | Ditto | 0.125 | 0.500 | ○ | 0.18 |
| EX. 28 | Ditto | 0.125 | 0.625 | ○ | 0.12 |
| EX. 29 | Ditto | 0.125 | 0.750 | ○ | 0.09 |
| EX. 30 | Ditto | 0.250 | 0.125 | ○ | 0.22 |
| EX. 31 | Ditto | 0.250 | 0.375 | ○ | 0.08 |
| EX. 32 | Ditto | 0.250 | 0.500 | ○ | 0.13 |
| EX. 33 | Ditto | 0.250 | 0.625 | ○ | 0.15 |
| EX. 34 | Ditto | 0.375 | 0.125 | ○ | 0.16 |
| EX. 35 | Ditto | 0.375 | 0.250 | ○ | 0.11 |
| EX. 36 | Ditto | 0.375 | 0.375 | ○ | 0.12 |
| EX. 37 | Ditto | 0.375 | 0.500 | ○ | 0.23 |
| EX. 38 | Ditto | 0.500 | 0.125 | ○ | 0.22 |
| EX. 39 | Ditto | 0.500 | 0.250 | ○ | 0.13 |

TABLE 2-continued

| | Compound | | | Single | Reaction resistance |
| | Composition | Value of x | Value of y | compound | [$\Omega cm^2$] |
| --- | --- | --- | --- | --- | --- |
| EX. 40 | Ditto | 0.500 | 0.375 | ○ | 0.17 |
| EX. 41 | Ditto | 0.625 | 0.250 | ○ | 0.22 |
| EX. 42 | Ditto | 0.750 | 0.125 | X | — |
| EX. 43 | Ditto | 0.075 | 0.125 | ○ | 0.98 |
| EX. 44 | Ditto | 0.075 | 0.250 | ○ | 0.22 |
| EX. 45 | Ditto | 0.075 | 0.375 | X | 0.17 |
| EX. 46 | Ditto | 0.075 | 0.500 | X | 0.12 |
| EX. 47 | Ditto | 0.075 | 0.625 | X | 0.17 |
| EX. 48 | Ditto | 0.075 | 0.750 | X | 0.18 |
| COMP. EX. 1 | $BaZr_{0.8}In_{0.2}O_{3-\delta}$ | | | ○ | 12.3 |
| COMP. EX. 2 | $La_{0.6}Sr_{0.4}Co_{0.2}Fe_{0.8}O_{3-\delta}$ | | | ○ | 0.49 |
| COMP. EX. 3 | $BaZr_{0.8}Yb_{0.2}O_{3-\delta}$ | | | ○ | 1.42 |

The electrode material according to the present disclosure is suited for a system using an electrochemical cell such as a hydrogen generation system or a fuel cell system. The electrode material according to the present disclosure may also be used in an electrochemical hydrogen pump such as a hydrogen purifier or a hydrogen compressor.

What is claimed is:

1. An electrode material comprising:
a compound represented by chemical formula $BaZr_{1-x-y}M_xCo_yO_{3-\delta}$, wherein
M is In, and the chemical formula satisfies $0<x<1$, $0<y<1$, $0<(x+y)<1$, and $0<\delta<1$, and
the chemical formula further satisfies mathematical formulas (1) to (3) below:

$$0.125 \leq y \leq 0.5 \quad \text{Mathematical formula (1);}$$

$$y \leq 3x - 0.25 \quad \text{Mathematical formula (2); and}$$

$$y \leq -3x + 2 \quad \text{Mathematical formula (3).}$$

2. The electrode material according to claim 1, wherein the chemical formula satisfies mathematical formulas (4) to (7) below:

$$0.125 \leq y \leq 0.375 \quad \text{Mathematical formula (4);}$$

$$0.25 \leq x \leq 0.5 \quad \text{Mathematical formula (5);}$$

$$y \geq -x + 0.5 \quad \text{Mathematical formula (6); and}$$

$$y \leq -x + 0.75 \quad \text{Mathematical formula (7).}$$

3. The electrode material according to claim 2, wherein the chemical formula satisfies mathematical formulas (8) to (11) below:

$$0.25 \leq x \leq 0.5 \quad \text{Mathematical formula (8);}$$

$$y \leq 0.375 \quad \text{Mathematical formula (9);}$$

$$y \leq -x + 0.75 \quad \text{Mathematical formula (10); and}$$

$$y \geq -0.5x + 0.375 \quad \text{Mathematical formula (11).}$$

4. The electrode material according to claim 1, wherein the electrode material is composed of the compound.

5. A membrane electrode assembly comprising:
a first electrode comprising the electrode material according to claim 1; and
an electrolyte membrane provided on a first main surface of the first electrode.

6. The membrane electrode assembly according to claim 5, wherein
the electrolyte membrane comprises at least one selected from the group consisting of compounds represented by chemical formula $BaZr_{1-x1}M1_{x1}O_{3-\delta}$, compounds represented by chemical formula $BaCe_{1-x2}M2_{x2}O_{3-\delta}$ and compounds represented by chemical formula $BaZr_{1-x3-y3}Ce_{x3}M3_{y3}Q_{3-\delta}$,
M1, M2 and M3 each comprise at least one selected from the group consisting of Pr, Nd, Pm, Sm, Eu, Gd, Tb, Dy, Ho, Er, Tm, Yb, Y, Sc, In and Lu, and
$0<x1<1$, $0<x2<1$, $0<x3<1$, $0<y3<1$, and $0<\delta<0.5$ are satisfied.

7. The membrane electrode assembly according to claim 6, wherein M1 is Yb.

8. An electrochemical cell comprising:
the membrane electrode assembly according to claim 5; and
a second electrode,
the first electrode, the electrolyte membrane and the second electrode being arranged in the order named.

9. The electrochemical cell according to claim 8, wherein the second electrode comprises at least one selected from the group consisting of NiO and Ni.

10. A fuel cell system comprising:
the electrochemical cell according to claim 8;
an oxidant gas supply line; and
a feedstock gas supply line,
the first electrode being connected to the oxidant gas supply line,
the second electrode being connected to the feedstock gas supply line.

11. An electrode material comprising:
a compound represented by chemical formula $BaZr_{1-x-y}M_xCo_yO_{3-\delta}$, wherein
M is Yb, and the chemical formula satisfies $0<x<1$, $0<y<1$, $0<(x+y)<1$, and $0<\delta<1$, and
the chemical formula further satisfies mathematical formulas (12) and (13) below:

$$0.075 \leq x \leq 0.625 \quad \text{Mathematical formula (12); and}$$

$$0.250 \leq y \quad \text{Mathematical formula (13).}$$

12. The electrode material according to claim 11, wherein the chemical formula satisfies mathematical formulas (14) and (15) below:

$$y \leq 12.5x - 0.6875 \quad \text{Mathematical formula (14); and}$$

$$y \geq x - 0.375 \quad \text{Mathematical formula (15).}$$

13. The electrode material according to claim 12, wherein the chemical formula satisfies mathematical formulas (16) and (17) below:

$$y \geq -2.5x + 0.4375 \qquad \text{Mathematical formula (16); and}$$

$$y \geq x - 0.375 \qquad \text{Mathematical formula (17).}$$

14. The electrode material according to claim 11, wherein $0.375 \leq y$.

* * * * *